United States Patent
Ando

(10) Patent No.: US 10,303,308 B2
(45) Date of Patent: *May 28, 2019

(54) TOUCH PANEL

(71) Applicant: Murata Manufacturing Co., Ltd., Nagaokakyo-shi, Kyoto-fu (JP)

(72) Inventor: Masamichi Ando, Nagaokakyo (JP)

(73) Assignee: MURATA MANUFACTURING CO., LTD., Nagaokakyo-shi, Kyoto-fu (JP)

( * ) Notice: Subject to any disclaimer, the term of this patent is extended or adjusted under 35 U.S.C. 154(b) by 590 days.

This patent is subject to a terminal disclaimer.

(21) Appl. No.: 14/959,134

(22) Filed: Dec. 4, 2015

(65) Prior Publication Data

US 2016/0109983 A1 Apr. 21, 2016

Related U.S. Application Data

(63) Continuation of application No. 14/174,146, filed on Feb. 6, 2014, now Pat. No. 9,348,473, which is a continuation of application No. PCT/JP2012/069099, filed on Jul. 27, 2012.

(30) Foreign Application Priority Data

Aug. 11, 2011 (JP) .................................. 2011-175476

(51) Int. Cl.
 *G06F 3/044* (2006.01)
(52) U.S. Cl.
 CPC .... *G06F 3/044* (2013.01); *G06F 2203/04103* (2013.01); *G06F 2203/04105* (2013.01)
(58) Field of Classification Search
 CPC ........... G06F 3/044; G06F 2203/04105; G06F 2203/04103

USPC .................................................. 345/173–178
See application file for complete search history.

(56) References Cited

U.S. PATENT DOCUMENTS

| 4,001,798 | A | 1/1977 | Robinson |
| 6,339,956 | B1 | 1/2002 | Huinink et al. |
| 9,348,473 | B2 * | 5/2016 | Ando ........................ G06F 3/044 |
| 2002/0062694 | A1 | 5/2002 | Ehrfeld et al. |
| 2004/0174287 | A1 | 9/2004 | Deak |

(Continued)

FOREIGN PATENT DOCUMENTS

| EP | 2 288 179 A1 | 2/2011 |
| EP | 2 290 719 A1 | 3/2011 |

(Continued)

OTHER PUBLICATIONS

PCT/JP2012/069099 Written Opinion dated Oct. 16, 2012.
PCT/JP20112/069099 ISR dated Oct. 16, 2012.

*Primary Examiner* — Amit Chatly
(74) *Attorney, Agent, or Firm* — Arent Fox LLP

(57) ABSTRACT

A touch panel that includes a piezoelectric film having a first principal surface and a second principal surface that are opposed to each other, a capacitance detection electrode arranged on one side of the first principal surface of the piezoelectric film and configured to detect a touched position, and a piezoelectric voltage detection electrode arranged on one side of each of the first principal surface and the second principal surface of the piezoelectric film and configured to detect a piezoelectric voltage in accordance with an amount pressed into the piezoelectric film.

12 Claims, 16 Drawing Sheets

(56) References Cited

U.S. PATENT DOCUMENTS

| | | | |
|---|---|---|---|
| 2009/0309616 A1* | 12/2009 | Klinghult | G06F 3/044 |
| | | | 324/686 |
| 2011/0096019 A1 | 4/2011 | Tsai et al. | |
| 2011/0109204 A1* | 5/2011 | Tajitsu | H01L 41/193 |
| | | | 310/348 |
| 2012/0038583 A1* | 2/2012 | Westhues | G06F 3/0412 |
| | | | 345/174 |
| 2012/0075221 A1 | 3/2012 | Yasuda | |
| 2012/0274599 A1* | 11/2012 | Schediwy | G06F 3/016 |
| | | | 345/174 |
| 2013/0027339 A1 | 1/2013 | Kodani et al. | |
| 2013/0068038 A1 | 3/2013 | Bolender | |
| 2013/0082970 A1 | 4/2013 | Frey et al. | |

FOREIGN PATENT DOCUMENTS

| | | |
|---|---|---|
| JP | H04-273316 A | 9/1992 |
| JP | H05-61592 A | 3/1993 |
| JP | 2005-213376 A | 8/2005 |
| JP | 2006-038710 A | 2/2006 |
| JP | 2006-163618 A | 6/2006 |
| JP | 2010-108490 A | 5/2010 |
| WO | WO 2009/010081 A1 | 1/2009 |
| WO | WO 2009/139237 A1 | 11/2009 |
| WO | WO 2010/104196 A1 | 9/2010 |
| WO | WO 2010/143528 A | 12/2010 |

* cited by examiner

A-A' cross section

B-B' cross section

C-C' cross section

D-D' cross section

FIG. 4
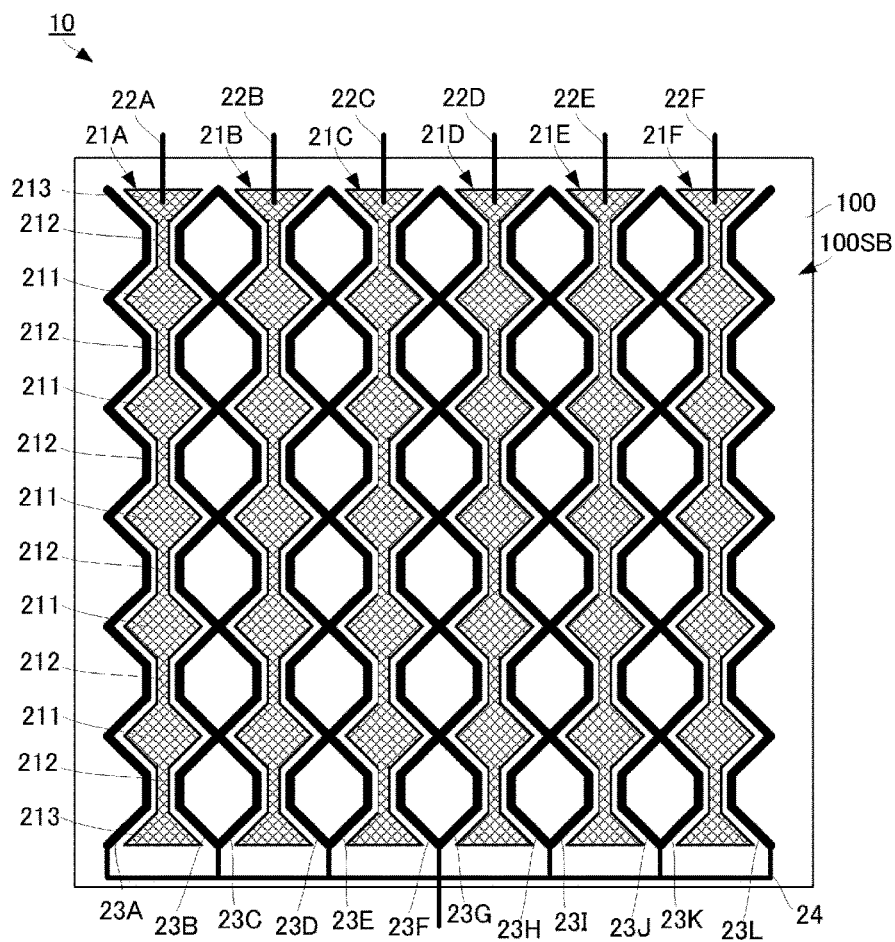
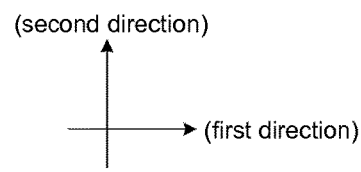

liquid crystal panel liquid crystal panel

⇧ generation of displacement

⇧ cancellation of displacement (second direction)

(first direction)

(second direction)

(first direction)

TOUCH PANEL

CROSS REFERENCE TO RELATED APPLICATIONS

The present application is a continuation of application Ser. No. 14/174,146, filed Feb. 6, 2014, which is a continuation of International application No. PCT/JP2012/069099, filed Jul. 27, 2012, which claims priority to Japanese Patent Application No. 2011-175476, filed Aug. 11, 2011, the entire contents of each of which are incorporated herein by reference.

FIELD OF THE INVENTION

The present invention relates to a touch panel that detects a position at which an operation input was made by a finger and the like and an amount pressed at the time of the operation.

BACKGROUND OF THE INVENTION

There have hitherto been contrived a variety of touch panels, in which, when a planar operation surface is touched by an operator with his or her finger and the like, a touched position and a pressed amount at the time of the touching are simultaneously detected.

For example, Patent Document 1 describes a touch input device having a structure such that a planar pressure-sensitive sensor and a touch panel for detecting a touched position are in close contact with and are superimposed each other. In this touch input device, the touched position is detected by the touch panel. The pressed amount is detected by the pressure-sensitive sensor formed separately from the touch panel and superimposed on the touch panel.

Patent Document 1: Japanese Patent Application Laid-Open No. 5-61592

SUMMARY OF THE INVENTION

However, in the touch input device described in Patent Document 1, for the purpose of detecting the touched position and the pressed amount, the respective use of the touch panel and the pressure-sensitive sensor and the superimposition of these are required. Therefore, the touch input device has a thickness not smaller than one obtained by adding a thickness of the touch panel and a thickness of the pressure-sensitive sensor, and is thus not easily formed to be thin.

Further, in the case of trying to make the touch input device highly translucent, in the structure described in Patent Document 1, it is not possible to obtain higher translucency than translucency obtained by adding translucency of the touch panel and translucency of the pressure-sensitive sensor. This ends up forming the touch panel input device with relatively low translucency.

Accordingly, an object of the present invention is to provide a thin touch panel capable of detecting a touched position and a pressed amount.

A touch panel of the present invention includes a flat membrane-like piezoelectric film provided with a first principal surface and a second principal surface that are opposed to each other, and includes a capacitance detection electrode arranged at least either on the first principal surface side or on the second principal surface side of the piezoelectric film. The capacitance detection electrode detects a touched position. The touch panel includes a piezoelectric voltage detection electrode arranged on each of the first principal surface side and the second principal surface side of the piezoelectric film. The piezoelectric voltage detection electrode detects a piezoelectric voltage in accordance with an amount pressed into the piezoelectric film.

According to this configuration, when the first principal surface of one piezoelectric film is regarded as an operation surface and the operator touches the operation surface, a capacitance at the touched position changes. This change in capacitance is detected by the capacitance detection electrode arranged at least either on the first principal surface side or on the second principal surface side, and the touched position is detected. Further, the piezoelectric voltage is obtained by the piezoelectric voltage detection electrodes arranged on the first principal surface side and the second principal surface side. With a piezoelectric voltage depending on a pressed amount, the pressed amount is detected by obtaining the piezoelectric voltage. Accordingly, the touched position and the pressed amount are detected in one piezoelectric film and the electrodes on both surfaces thereof, and the touch panel can thus be formed to be thin.

Further, it is preferable that the piezoelectric film of the touch panel of the present invention be made up of polylactic acid having been stretch-treated at least in a uniaxial direction.

According to this configuration, since the uniaxially stretched polylactic acid has a high piezoelectric constant and a low permittivity, when polylactic acid is used as a material for the piezoelectric film, the detection sensitivity to an amount pressed by touching becomes high and the detection sensitivity to a change in capacitance by touching also becomes high. Accordingly, even in the configuration of only one piezoelectric film, both the touched position and the pressed amount can be detected with higher accuracy than in the conventional structure formed by superimposition of the capacitance detection touch panel and pressure-sensitive sensor. Further, since polylactic acid has high translucency as does an acrylic resin, a highly translucent touch panel can be realized. With polylactic acid not having pyroelectricity, even when a body heat is transmitted at the time of the finger or the like touching the surface of the touch panel, this does not have an effect on the detected voltage of the pressed amount (pressed force). Hence in the case of using polylactic acid as the material for the piezoelectric film, as compared with the case of using a piezoelectric film having pyroelectricity, such as PVDF, it is not necessary to add such a complicated mechanism where pressed force is indirectly transmitted so as to prevent transmission of a body heat.

Further, it is preferable that the touch panel of the present invention have the following configuration. The capacitance detection electrode is provided with: a plurality of first capacitance detection sub-electrodes, which are made up of an extending shape along a first direction that is in parallel with the first principal surface and the second principal surface, and arranged at intervals in a second direction that is in parallel with the first principal surface and the second principal surface and intersects with the first direction; and a plurality of second capacitance detection sub-electrodes, which are made up of an extending shape along the second direction, and arranged at intervals in the first direction. The piezoelectric voltage detection electrode is provided with: a first piezoelectric voltage detection sub-electrode formed on the first principal surface; and a second piezoelectric voltage detection sub-electrode formed on the second principal surface. The first capacitance detection sub-electrode and the first piezoelectric voltage detection sub-electrode are formed on the same plane.

According to this configuration, the capacitance detection electrode includes the first capacitance detection sub-electrode extending in the first direction and the second capacitance detection sub-electrode extending in the second direction that intersects with the first direction, thereby allowing detection of a touched position in a two-dimensional coordinate. With the first capacitance detection sub-electrode and the first piezoelectric voltage detection sub-electrode being on the same plane, the touch panel can be made thin.

Further, in the touch panel of the present invention, the first piezoelectric voltage detection sub-electrode is formed between individual first capacitance detection sub-electrodes constituting the plurality of first capacitance detection sub-electrodes.

According to this configuration, the first capacitance detection sub-electrode and the first piezoelectric voltage detection sub-electrode are efficiently arranged on the same plane.

Further, in the touch panel of the present invention, it is preferable that the first capacitance detection sub-electrode be formed on the first principal surface and the second capacitance detection sub-electrode be formed on the second principal surface.

According to this configuration, since a dielectric sandwiched between the first capacitance detection sub-electrode and the second capacitance detection sub-electrode serves as the piezoelectric film, this dielectric is not separately required, thereby simplifying the structure of the touch panel.

In the foregoing preferred embodiment, it is preferable to adopt a configuration as follows. The second piezoelectric voltage detection sub-electrode is formed between individual second capacitance detection sub-electrodes constituting the plurality of second capacitance detection sub-electrodes, and the first piezoelectric voltage detection sub-electrode and the second piezoelectric voltage detection sub-electrode are formed by being substantially uniformly distributed substantially all over the surfaces of the piezoelectric film so as to be opposed to each other via the piezoelectric film.

According to this configuration, it is possible to substantially uniformly detect pressed force substantially all over the surfaces of the first principal surface and the second principal surface. It is then possible to gain an opposed area in accordance with a length and a width of the piezoelectric voltage detection sub-electrode. Therefore, even when each piezoelectric voltage detection sub-electrode does not have a very high electric charge detecting ability, an opposed area of the first principal surface and the second principal surface as a whole by means of all the first and second piezoelectric voltage detection sub-electrodes can be ensured to not less than a certain degree, thereby allowing efficient detection of generation of electric charges due to a piezoelectric effect. Further, since a piezoelectric constant is high in the case of using polylactic acid as the material for the piezoelectric film, when the opposed area by means of the first and second piezoelectric voltage detection sub-electrodes can be ensured to a certain degree, it is possible to detect a sufficient electric charge amount for detecting the pressed amount.

Further, the touch panel of the present invention may adopt the following configuration. Protective layers are formed on the surfaces of the plurality of first capacitance detection sub-electrodes and the surfaces of the first piezoelectric voltage detection sub-electrodes. The plurality of second capacitance detection sub-electrodes are formed on the opposite side to the plurality of first capacitance detection sub-electrodes and the first piezoelectric voltage detection sub-electrodes via the protective layer.

According to this configuration, since the first capacitance detection sub-electrodes and the second capacitance detection sub-electrodes are arranged via the extremely thin protective layer, it is possible to further enhance the detection sensitivity to the change in capacitance.

Further, in the touch panel of the present invention, it is preferable that the first capacitance detection sub-electrode and the second capacitance detection sub-electrode be each made up of a shape where a wide section and a narrow section are alternately connected, and the first capacitance detection sub-electrode and the second capacitance detection sub-electrode be formed such that the narrow section of the first capacitance detection sub-electrode and the narrow section of the second capacitance detection sub-electrode are opposed to each other via the piezoelectric film.

According to this configuration, since the wide sections of the first capacitance detection sub-electrode and the second capacitance detection sub-electrode, each having a large area, do not overlap as seen from a direction orthogonal to the operation surface (first principal surface), when the operator touches the operation surface with his or her finger or the like, a change in capacitance tends to occur, thereby facilitating detection of the touched position. That is, it is possible to improve the detection sensitivity to the touched position.

Further, the piezoelectric voltage detection electrode of the touch panel of the present invention can be individually formed in each partial region obtained by dividing the plane of the piezoelectric film into four regions.

According to this configuration, by dividing the plane (operation surface) of the piezoelectric film into four regions, each region has a structure the same as one where only two orthogonal sides are fixed even when four sides of the operation surface of the piezoelectric film are fixed. Therefore, by obtaining a detected voltage in each region as thus divided, it is possible to effectively detect the pressed amount even when the four sides of the operation surface of the piezoelectric film are fixed.

Further, the piezoelectric voltage detection electrode of the touch panel of the present invention can be formed for each partial region as spaced from one another.

In this configuration, since the piezoelectric voltage detection electrode is formed for each partial region, a detected voltage in accordance with that partial region can be obtained for each partial region.

Further, the touch panel of the present invention may also be realized by the following configuration. The piezoelectric voltage detection electrode is made up of a shape where an electrode in a first partial region and an electrode in a second partial region on the first principal surface are spaced from each other. The piezoelectric voltage detection electrode is made up of a shape where an electrode in a third partial region and an electrode in a fourth partial region on the first principal surface are continued to each other. The piezoelectric voltage detection electrode is made up of a shape where an electrode in the first partial region and an electrode in the third partial region on the second principal surface are continued to each other. The piezoelectric voltage detection electrode is made up of the a shape where an electrode in the second partial region and an electrode in the fourth partial region on the second principal surface are continued to each other.

In this configuration, there is realized a structure where the piezoelectric voltage detection electrode in the first partial region, the piezoelectric voltage detection electrode in the third partial region, the piezoelectric voltage detection electrode in the fourth partial region and the piezoelectric voltage detection electrode in the second partial region are connected in series in this order. This eliminates the extra need for a drawing electrode for adding the detected voltage in each partial region. Hence a configuration, which includes a circuit not only for detecting the pressed amount in each partial region but also for adding up detected voltages, can be formed into a small size.

Further, it is preferable that the touch panel of the present invention have the following configuration. The first capacitance detection sub-electrode and the second capacitance detection sub-electrode are formed such that the wide section of the first capacitance detection sub-electrode and the wide section of the second capacitance detection sub-electrode are not opposed to each other, and a gap having a predetermined width is formed between both the wide sections as seen from a direction orthogonal to the principal surface of the piezoelectric film. The first piezoelectric voltage detection sub-electrode and the second piezoelectric voltage detection sub-electrode are formed such that the opposed portion of the first piezoelectric voltage detection sub-electrode and the second piezoelectric voltage detection sub-electrode is held within the gap.

According to this configuration, the first and second capacitance detection sub-electrodes and the first and second piezoelectric voltage detection sub-electrodes can be effectively arranged without degrading the performance of detecting a capacitance and a piezoelectric voltage.

Further, it is more preferable that the touch panel of the present invention have the following configuration. The wide section of the first capacitance detection sub-electrode and the wide section of the second capacitance detection sub-electrode are formed in a substantially square shape having an oblique line at substantially 45° with respect to each of the first direction and the second direction. The first piezoelectric voltage detection sub-electrode has: a linear section extending in the first direction along the narrow section of the first capacitance detection sub-electrode; and an inclined section inclined at substantially 45° with respect to the first direction along the wide section of the first capacitance detection sub-electrode. The second piezoelectric voltage detection sub-electrode has: a linear section extending in the second direction along the narrow section of the second capacitance detection sub-electrode; and an inclined section inclined at substantially 45° with respect to the second direction along the wide section of the second capacitance detection sub-electrode. The inclined section of the first piezoelectric voltage detection sub-electrode and the inclined section of the second piezoelectric voltage detection sub-electrode are opposed to each other with the piezoelectric film placed therebetween.

According to this configuration, the first and second capacitance detection sub-electrodes and the first and second piezoelectric voltage detection sub-electrodes can be more effectively arranged.

According to the present invention, it is possible to realize a thin touch panel capable of detecting a touched position and a pressed amount.

BRIEF EXPLANATION OF THE DRAWINGS

FIG. 4 is a plan view of a second principal surface 100SB of the principal function section 10 constituting the touch panel 1 according to the first embodiment of the present invention;

DETAILED DESCRIPTION OF THE INVENTION

Figure 1:
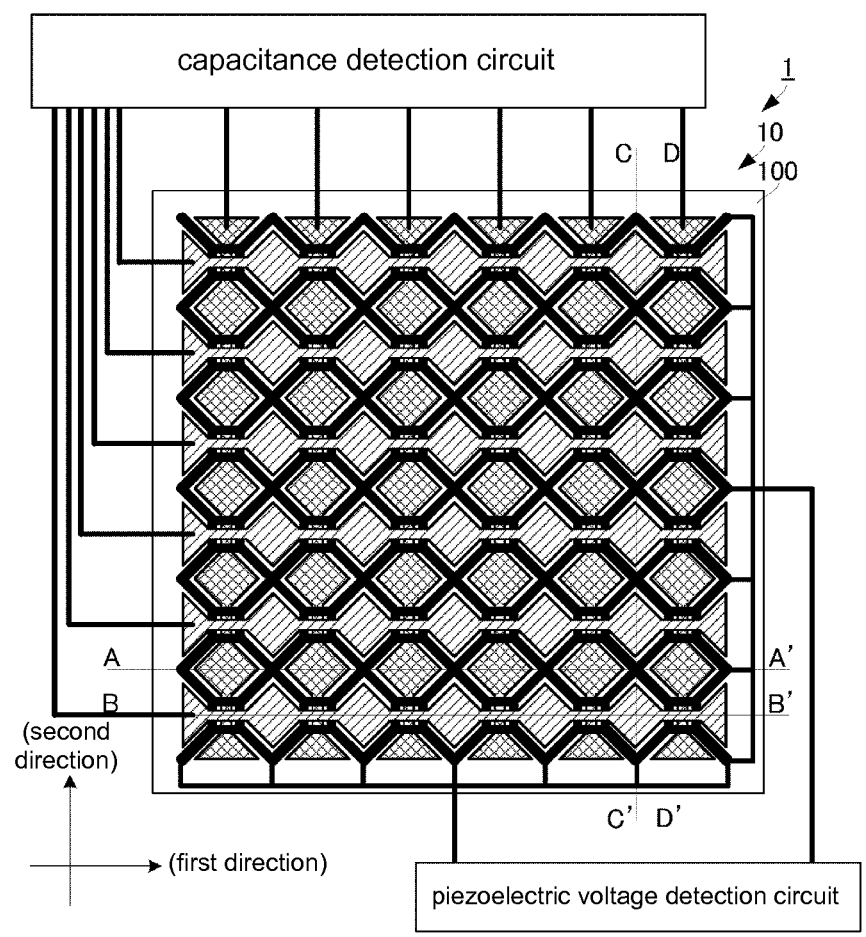
FIG. 1 is a plan view of a touch panel 1 according to a first embodiment of the present invention.
Figure 2A:
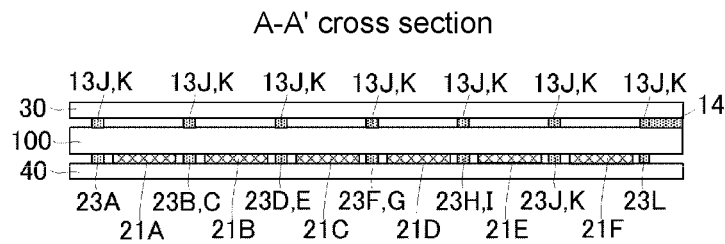
FIGS. 2A to 2D are a plurality of sectional views of the touch panel 1 according to the first embodiment of the present invention.
Figure 2B:
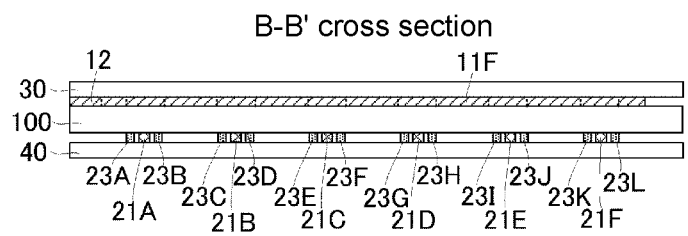
Figure 2C:
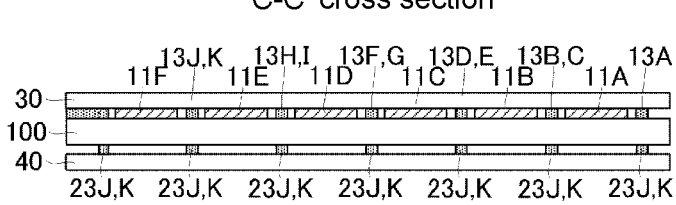
Figure 2D:
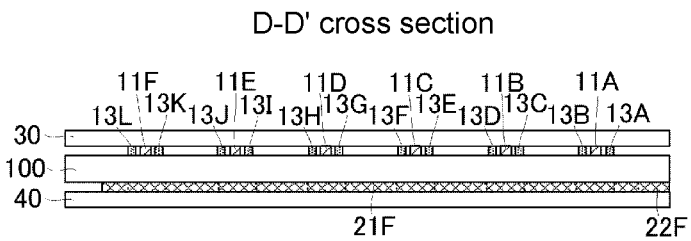
Figure 3:
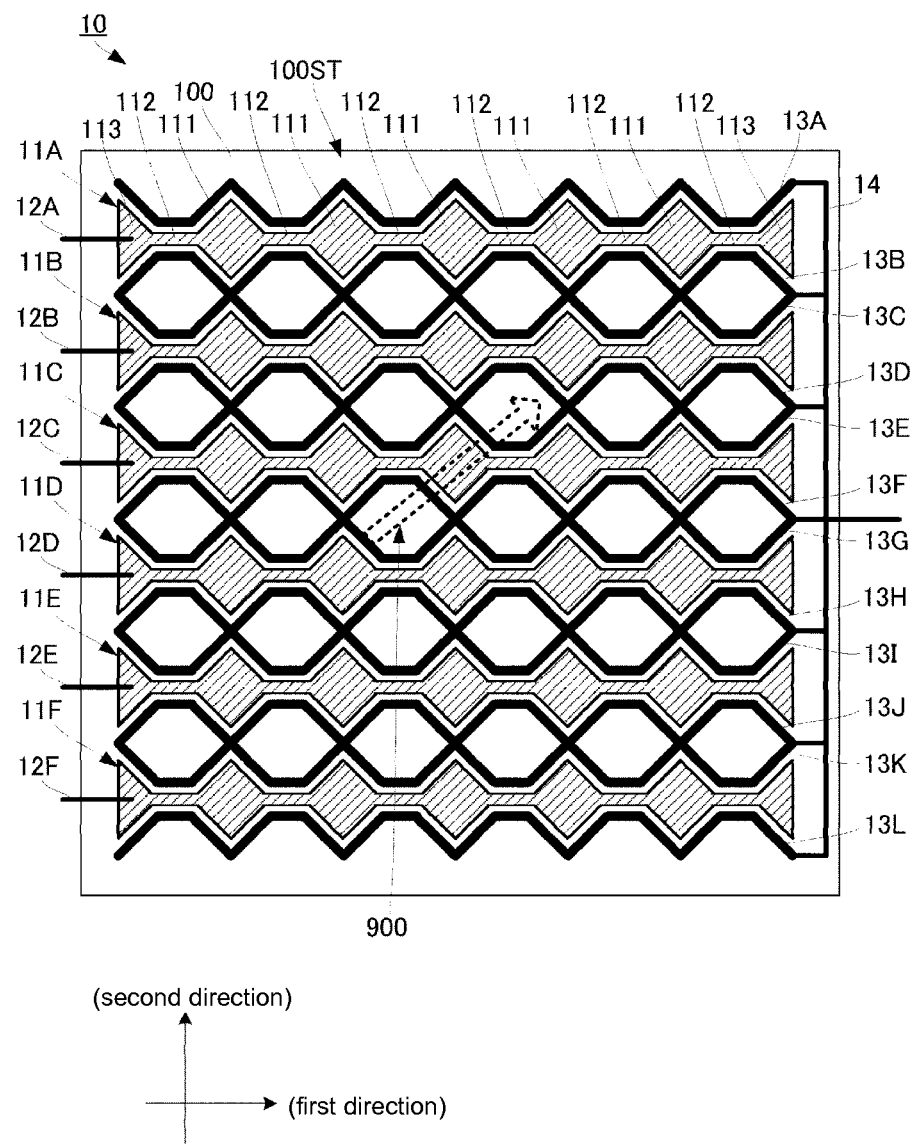
FIG. 3 is a plan view of a first principal surface 100ST of a principal function section 10 constituting the touch panel 1 according to the first embodiment of the present invention.

A touch panel according to a first embodiment of the present invention will be described with reference to the drawings. FIG. 1 is a plan view of a principal function section 10 of a touch panel 1 according to a first embodiment of the present invention. FIGS. 2A to 2D are an A-A' sectional view, a B-B' sectional view, a C-C' sectional view and a D-D' sectional view, respectively, in the principal function section 10 of the touch panel 1 according to the first embodiment of the present invention. FIG. 3 is a plan view of a first principal surface 100ST of the principal function section 10 constituting the touch panel 1 according to the first embodiment of the present invention. FIG. 4 is a plan view of a second principal surface 100SB of the principal function section 10 constituting the touch panel 1 according to the first embodiment of the present invention. It is to be noted that FIGS. 3 and 4 are views of the first principal surface 100ST and the second principal surface 100SB as seen from the first principal surface 100SST side. It is to be noted that an electrode pattern of FIGS. 1, 2, 3 and 4 is one example, and the numbers of first capacitance detection sub-electrodes, second capacitance detection sub-electrodes, first piezoelectric voltage detection sub-electrodes and second piezoelectric voltage detection sub-electrodes are not restricted to these, but these numbers are decided as appropriate in accordance with the specification of the touch panel.

The touch panel 1 includes a piezoelectric film 100, protective layers 30, 40, and a piezoelectric voltage detection electrode and a capacitance detection electrode which are formed in an undermentioned pattern.

The piezoelectric film 100 is made up of a rectangular-shaped flat membrane provided with a first principal surface 100ST and a second principal surface 100SB which are opposed to each other. The piezoelectric film 100 is formed by uniaxially stretched L-shaped polylactic acid (PLLA).

PLLA is a chiral polymer, and its principal chain has a spiral structure. When PLLA is uniaxially stretched and its molecules are oriented, it has piezoelectric properties. A piezoelectric constant of the uniaxially stretched PLLA belongs to a category of very high piezoelectric constants among those of a variety of polymers.

It is to be noted that a stretch ratio is preferably the order of three to eight times. Polylactic acid is thermally treated after stretched, thereby leading to promotion of crystallization of its extended chain crystal and improvement in its piezoelectric constant. It should be noted that in the case of performing a biaxial stretch, stretch ratios of the respective axes are made different, thereby making it possible to obtain a similar effect to that of the uniaxial stretch. For example, when a certain direction is regarded as an X-axis and an eightfold stretch is applied in that direction while a two-fold stretch is applied in a Y-axis direction orthogonal to the above direction, as for the piezoelectric constant, there can be obtained an equivalent effect to that in the case of applying a fourfold uniaxial stretch in the approximately X-axis direction. Simply because a uniaxially stretched film is apt to split along an axial direction of the stretch, performing the biaxial stretch as described above can increase the strength to a certain degree.

Further, PLLA generates the piezoelectric properties due to molecular alignment processing by the stretch and the like, and does not need to be subjected to polling processing as do other polymers such as PVDF and piezoelectric ceramic. That is, the piezoelectric properties of PLLA not included in ferrodielectrics are not expressed by polarization of ions, as are those of the ferrodielectrics such as PVDF and PZT, but the piezoelectric properties of PLLA are derived from a spiral structure as a characteristic structure of molecules. For this reason, the pyroelectricity, which are generated in other ferrodielectric piezoelectric bodies, are not generated in PLLA. Further, although fluctuations in piezoelectric constants of PVDF and the like may be observed over time or may significantly decrease in some cases, the piezoelectric constant of PLLA is extremely stable over time.

Moreover, since PLLA has an extremely low relative permittivity of about 2.5, when d is a piezoelectric constant and $\varepsilon^T$ is a permittivity, a piezoelectric output constant (=piezoelectric g constant: $g=d/\varepsilon^T$) becomes a large value.

Herein, from the foregoing formula, the piezoelectric g constant of PVDF, with a permittivity $\varepsilon_{33}{}^T=13\times\varepsilon_0$ and a piezoelectric constant $d_{31}=25$ pC/N, is: $g_{31}=0.2172$ Vm/N. Meanwhile, when the piezoelectric g constant of PLLA, with the piezoelectric constant $d_{14}=10$ pC/N, is obtained by conversion to $g_{31}$, $d_{14}=2\times d_{31}$ and hence $d_{31}=5$ pC/N, whereby the piezoelectric g constant is: $g_{31}=0.2258$ Vm/N. Accordingly, in PLLA with the piezoelectric constant $d_{14}=10$ pC/N, the detection sensitivity to a pressed amount, which is similar to that in PVDF, can be sufficiently obtained. The inventor of the present invention has experimentally obtained PLLA with $d_{14}=15$ to 20 pC/N, and by use of this PLLA, it is possible to obtain a pressed amount with further exceedingly high sensitivity.

Moreover, as described above, PLLA has a low permittivity differently from general ferrodielectrics where high piezoelectric constants can be obtained. Therefore, an electric field confinement effect between the electrode formed on the first principal surface 100ST and the electrode formed on the second principal surface 100SB is low. For this reason, upon approach or contact of a dielectric such as a finger from the outside, a capacitance is apt to change. That is, the detection sensitivity to a change in capacitance is high.

On the first principal surface 100ST of the piezoelectric film 100 made up of PLLA having such characteristics, a plurality of first capacitance detection sub-electrodes 11A to 11F constituting the capacitance detection electrode and a plurality of first piezoelectric voltage detection sub-electrodes 13A to 13L constituting the piezoelectric voltage detection electrode are formed in such a pattern as illustrated in FIGS. 1 and 3. For these plurality of first capacitance detection sub-electrodes 11A to 11F and plurality of first piezoelectric voltage detection sub-electrodes 13A to 13L, there may favorably be used any of an organic electrode primarily composed of ITO, ZnO or polythiophene, an organic electrode primarily composed of polyaniline, an electrode using a silver nanowire and an electrode using a carbon nanotube. Using these materials makes it possible to form a highly translucent electrode pattern. These materials can be formed by vapor deposition, sputtering, plating and the like. It is to be noted that, when the transparency is not required, there can be used an electrode of a metal system other than the above materials, formed by vapor deposition, sputtering, plating or the like, or an electrode formed by silver pasting.

The plurality of first capacitance detection sub-electrodes 11A to 11F are each made up of the same shape. Specifically, for example, the first capacitance detection sub-electrode 11A is provided with a plurality of wide sections 111 and a plurality of narrow sections 112, and a pair of end wide sections 113. Each wide section 111 is made up of a square. The wide section 111 is not necessarily a square, but may be a rhombus, a parallelogram or the like, and can be made up of an arbitrary shape required by a sensing IC. The narrow section 112 is made up of a rectangular shape having a large length with respect to its width. The end wide section 113 is made up of a substantially isosceles triangle. The plurality of wide sections 111 and plurality of narrow sections 112 are connected so as to be alternately arrayed along an extending direction of the first capacitance detection sub-electrode 11A. At this time, each wide section 111 is connected to the narrow section 112 such that a diagonal line of the square is in parallel with a connecting direction to the narrow section 112. Further, each wide section 111 is connected to the narrow sections 112 at a pair of vertical angles that form the diagonal line.

The end wide section 113 is provided at each end of the extending direction of the first capacitance detection sub-electrode 11A. Each end of a continuous electrode pattern made up of the plurality of wide sections 111 and the plurality of narrow sections 112 is connected to the end wide section 113 by the narrow section 112. At this time, the end wide section 113 is connected to the narrow section 112 at a vertical angle of the isosceles triangle.

The plurality of first capacitance detection sub-electrodes 11A to 11F are formed so as to be extended along a first direction on the first principal surface 100ST of the piezoelectric film 100. The plurality of first capacitance detection sub-electrodes 11A to 11F are formed at predetermined intervals along a second direction orthogonal to the first direction on the first principal surface 100ST. At this time, the plurality of first capacitance detection sub-electrodes 11A to 11F are formed such that the respective wide sections 111 are located at the same position along the first direction, i.e. such that the respective wide sections 111 are arrayed along the second direction.

Herein, the first direction and the second direction are set in directions each forming an angle of substantially 45° with respect to a uniaxially stretched direction 900 of the piezoelectric film 100. Substantially 45° refers to angles including the order of 45°±10°, for example. These angles are design matters to be decided as appropriate in accordance with a whole design such as bending sensing accuracy based on an application of a displacement sensor.

The plurality of first piezoelectric voltage detection sub-electrodes 13A to 13L are formed in shapes along outer shapes of the first capacitance detection sub-electrodes 11A to 11F, as spaced from the first capacitance detection sub-electrodes 11A to 11F.

Specifically, the first piezoelectric voltage detection sub-electrode 13A is formed along the outer diameter shape of the first capacitance detection sub-electrode 11A on the opposite side to the first capacitance detection sub-electrode 11B, as spaced from the first capacitance detection sub-electrode 11A.

The first piezoelectric voltage detection sub-electrode 13B is formed along the outer diameter shape of the first capacitance detection sub-electrode 11A on the side of the first capacitance detection sub-electrode 11B, as spaced from the first capacitance detection sub-electrode 11A. The first piezoelectric voltage detection sub-electrode 13C is formed along the outer diameter shape of the first capacitance detection sub-electrode 11B on the side of the first capacitance detection sub-electrode 11A, as spaced from the first capacitance detection sub-electrode 11B. The first piezoelectric voltage detection sub-electrodes 13B, 13C are connected to each other in the vicinities of corner sections of the wide section 111 and the end wide section 113 of the first capacitance detection sub-electrode.

The first piezoelectric voltage detection sub-electrode 13D is formed along the outer diameter shape of the first capacitance detection sub-electrode 11B on the side of the first capacitance detection sub-electrode 11C, as spaced from the first capacitance detection sub-electrode 11B. The first piezoelectric voltage detection sub-electrode 13E is formed along the outer diameter shape of the first capacitance detection sub-electrode 11C on the side of the first capacitance detection sub-electrode 11B, as spaced from the first capacitance detection sub-electrode 11C. The first piezoelectric voltage detection sub-electrodes 13D, 13E are connected to each other in the vicinities of corner sections of the wide section 111 and the end wide section 113 of the first capacitance detection sub-electrode.

The first piezoelectric voltage detection sub-electrode 13F is formed along the outer diameter shape of the first capacitance detection sub-electrode 11C on the side of the first capacitance detection sub-electrode 11D, as spaced from the first capacitance detection sub-electrode 11C. The first piezoelectric voltage detection sub-electrode 13G is formed along the outer diameter shape of the first capacitance detection sub-electrode 11D on the side of the first capacitance detection sub-electrode 11C, as spaced from the first capacitance detection sub-electrode 11D. The first piezoelectric voltage detection sub-electrodes 13F, 13G are connected to each other in the vicinities of corner sections of the wide section 111 and the end wide section 113 of the first capacitance detection sub-electrode.

The first piezoelectric voltage detection sub-electrode 13H is formed along the outer diameter shape of the first capacitance detection sub-electrode 11D on the side of the first capacitance detection sub-electrode 11E, as spaced from the first capacitance detection sub-electrode 11D. The first piezoelectric voltage detection sub-electrode 13I is formed along the outer diameter shape of the first capacitance detection sub-electrode 11E on the side of the first capacitance detection sub-electrode 11D, as spaced from the first capacitance detection sub-electrode 11E. The first piezoelectric voltage detection sub-electrodes 13H, 13I are connected to each other in the vicinities of corner sections of the wide section 111 and the end wide section 113 of the first capacitance detection sub-electrode.

The first piezoelectric voltage detection sub-electrode 13J is formed along the outer diameter shape of the first capacitance detection sub-electrode 11E on the side of the first capacitance detection sub-electrode 11F, as spaced from the first capacitance detection sub-electrode 11E. The first piezoelectric voltage detection sub-electrode 13K is formed along the outer diameter shape of the first capacitance detection sub-electrode 11F on the side of the first capacitance detection sub-electrode 11E, as spaced from the first capacitance detection sub-electrode 11F. The first piezoelectric voltage detection sub-electrodes 13J, 13K are connected to each other in the vicinities of corner sections of the wide section 111 and the end wide section 113 of the first capacitance detection sub-electrode.

The first piezoelectric voltage detection sub-electrode 13L is formed along the outer diameter shape of the first capacitance detection sub-electrode 11F on the opposite side to the first capacitance detection sub-electrode 11E, as spaced from the first capacitance detection sub-electrode 11F.

The first piezoelectric voltage detection sub-electrodes 13A to 13K are put together by a drawing electrode 14, and connected to the external circuit. The first capacitance detection sub-electrodes 11A to 11F are individually connected to the drawing electrodes 12A to 12E, and connected to the external circuit via the drawing electrodes 12A to 12F. These drawing electrodes 12A to 12F, 14 are formed on the outside of the formation regions for the first capacitance detection sub-electrodes 11A to 11F and the first piezoelectric voltage detection sub-electrodes 13A to 13K. Further, the drawing electrodes 12A to 12F are formed at one end of the first direction and the drawing electrode 14 is formed at the other end of the first direction.

Moreover, on the second principal surface 100SB of the piezoelectric film 100, a plurality of second capacitance detection sub-electrodes 21A, 21B, 21C, 21D, 21E, 21F constituting the capacitance detection electrode and a plurality of second piezoelectric voltage detection sub-electrodes 23A, 23B, 23C, 23D, 23E, 23F, 23G, 23H, 23I, 23J, 23K, 23L constituting the piezoelectric voltage detection electrode are formed in such a pattern as illustrated in FIGS. 1 and 4. Also for these plurality of second capacitance detection sub-electrodes 21A to 21F and plurality of second piezoelectric voltage detection sub-electrodes 23A to 23L, there may favorably be used any of an organic electrode primarily composed of ITO, ZnO or polythiophene, an organic electrode primarily composed of polyaniline, an electrode using a silver nanowire and an electrode using a carbon nanotube. Using these materials can form a highly translucent electrode pattern. It is to be noted that, when the transparency is not required, there can be used electrodes formed by silver pasting or electrodes formed of a metal system formed by vapor deposition, sputtering, plating or the like.

The plurality of second capacitance detection sub-electrodes 21A to 21F are each made up of the same shape. Specifically, for example, the second capacitance detection sub-electrode 21A is provided with a plurality of wide sections 211 and plurality of narrow sections 212, and a pair of end wide sections 213. Each wide section 211 is made up of a square. The wide section 211 is not necessarily a square, but may be a rhombus, a parallelogram and the like, and can be made up of an arbitrary shape required by a sensing IC. The narrow section 212 is made up of a rectangular shape having a large length with respect to its width. The end wide section 213 is made up of a substantially isosceles triangle. The plurality of wide sections 211 and plurality of narrow sections 212 are connected so as to be alternately arrayed along an extending direction of the second capacitance detection sub-electrode 21A. At this time, each wide section 211 is connected to the narrow section 212 such that a diagonal line of the square is in parallel with a connecting direction to the narrow section 212. Further, each wide section 211 is connected to the narrow section 212 at a pair of vertical angles that form the diagonal line.

The wide section 213 is provided at each end of the extending direction of the second capacitance detection sub-electrode 21A. Each end of a continuous electrode pattern made up of the plurality of wide sections 211 and the plurality of narrow sections 212 is connected to the end wide section 213 by the narrow sections 212. At this time, the end wide section 213 is connected to the narrow section 212 at a vertical angle of the isosceles triangle.

The plurality of second capacitance detection sub-electrodes 21A to 21F are formed so as to be extended along a second direction on the second principal surface 100SB of the piezoelectric film 100. The plurality of second capacitance detection sub-electrodes 21A to 21F are formed at predetermined intervals along a first direction orthogonal to the second direction on the second principal surface 100SB. At this time, the plurality of second capacitance detection sub-electrodes 21A to 21F are formed such that the respective wide sections 211 are located at the same position along the second direction, i.e. such that the respective wide sections 211 are arrayed along the first direction.

Further, the plurality of second capacitance detection sub-electrodes 21A to 21F are formed such that the respective wide sections 212 are not opposed to the wide sections 111 of the first capacitance detection sub-electrodes 11A to 11F via the piezoelectric film 100. In other words, as seen from the first principal surface 100ST side, the second capacitance detection sub-electrodes 21A to 21F are formed such that the respective wide sections 212 constituting the plurality of second capacitance detection sub-electrodes 21A to 21F are not superimposed on the respective wide sections 111 constituting the first capacitance detection sub-electrodes 11A to 11F. Further put it differently, the plurality of first capacitance detection sub-electrodes 11A to 11F and the plurality of second capacitance detection sub-electrodes 21A to 21F are opposed to each other via the piezoelectric film 100 only in portions of the narrow sections 112, 212.

Moreover, as seen from the first principal surface 100ST side, the first capacitance detection sub-electrodes 11A to 11F and the second capacitance detection sub-electrodes 21A to 21F are formed such that gaps having predetermined widths are formed between the respective wide sections 211 constituting the plurality of second capacitance detection sub-electrodes 21A to 21F and the respective wide sections 111 constituting the first capacitance detection sub-electrodes 11A to 11F. Then, the widths of the gaps are set such that the first piezoelectric voltage detection sub-electrodes 13A to 13K formed on the foregoing first principal surface 100ST are held within the gaps as seen from the first principal surface 100ST side.

The plurality of second piezoelectric voltage detection sub-electrodes 23A to 23L are formed in shapes along outer diameter shapes of the second capacitance detection sub-electrodes 21A to 21F as spaced from the second capacitance detection sub-electrodes 21A to 21F.

Specifically, the second piezoelectric voltage detection sub-electrode 23A is formed along the outer diameter shape of the second capacitance detection sub-electrode 21A on the opposite side to the second capacitance detection sub-electrode 21B, as spaced from the second capacitance detection sub-electrode 21A.

The second piezoelectric voltage detection sub-electrode 23B is formed along the outer diameter shape of the second capacitance detection sub-electrode 21A on the side of the second capacitance detection sub-electrode 21B, as spaced from the second capacitance detection sub-electrode 21A. The second piezoelectric voltage detection sub-electrode 23C is formed along the outer diameter shape of the second capacitance detection sub-electrode 21B on the side of the second capacitance detection sub-electrode 21A, as spaced from the second capacitance detection sub-electrode 21B. The second piezoelectric voltage detection sub-electrodes 23B, 23C are connected to each other in the vicinities of corner sections of the wide section 211 and the end wide section 213 of the second capacitance detection sub-electrode.

The second piezoelectric voltage detection sub-electrode 23D is formed along the outer diameter shape of the second capacitance detection sub-electrode 21B on the side of the second capacitance detection sub-electrode 21C, as spaced from the second capacitance detection sub-electrode 21B.

The second piezoelectric voltage detection sub-electrode 23E is formed along the outer diameter shape of the second capacitance detection sub-electrode 21C on the side of the second capacitance detection sub-electrode 21B, as spaced from the second capacitance detection sub-electrode 21C. The second piezoelectric voltage detection sub-electrodes 23D, 23E are connected to each other in the vicinities of corner sections of the wide section 211 and the end wide section 213 of the second capacitance detection sub-electrode.

The second piezoelectric voltage detection sub-electrode 23F is formed along the outer diameter shape of the second capacitance detection sub-electrode 21C on the side of the second capacitance detection sub-electrode 21D, as spaced from the second capacitance detection sub-electrode 21C. The second piezoelectric voltage detection sub-electrode 23G is formed along the outer diameter shape of the second capacitance detection sub-electrode 21D on the side of the second capacitance detection sub-electrode 21C, as spaced from the second capacitance detection sub-electrode 21D. The second piezoelectric voltage detection sub-electrodes 23F, 23G are connected to each other in the vicinities of corner sections of the wide section 211 and the end wide section 213 of the second capacitance detection sub-electrode.

The second piezoelectric voltage detection sub-electrode 23H is formed along the outer diameter shape of the second capacitance detection sub-electrode 21D on the side of the second capacitance detection sub-electrode 21E, as spaced from the second capacitance detection sub-electrode 21D. The second piezoelectric voltage detection sub-electrode 23I is formed along the outer diameter shape of the second capacitance detection sub-electrode 21E on the side of the second capacitance detection sub-electrode 21D, as spaced from the second capacitance detection sub-electrode 21E. The second piezoelectric voltage detection sub-electrodes 23H, 23I are connected to each other in the vicinities of corner sections of the wide section 211 and the end wide section 213 of the second capacitance detection sub-electrode.

The second piezoelectric voltage detection sub-electrode 23J is formed along the outer diameter shape of the second capacitance detection sub-electrode 21E on the side of the second capacitance detection sub-electrode 21F, as spaced from the second capacitance detection sub-electrode 21E. The second piezoelectric voltage detection sub-electrode 23K is formed along the outer diameter shape of the second capacitance detection sub-electrode 21F on the side of the second capacitance detection sub-electrode 21E, as spaced from the second capacitance detection sub-electrode 21F. The second piezoelectric voltage detection sub-electrodes 23J, 23K are connected to each other in the vicinities of corner sections of the wide section 211 and the end wide section 213 of the second capacitance detection sub-electrode.

The second piezoelectric voltage detection sub-electrode 23L is formed along the outer diameter shape of the second capacitance detection sub-electrode 21F on the opposite side to the second capacitance detection sub-electrode 21E, as spaced from the second capacitance detection sub-electrode 21F.

Then, the second piezoelectric voltage detection sub-electrodes 23A to 23L formed on the second principal surface 100SB and the first piezoelectric voltage detection sub-electrodes 13A to 13K formed on the first principal surface 100ST are formed so as to be opposed to each other over the substantially entire length thereof via the piezoelectric film 100 in gaps generated between the wide sections 211, 213 and the wide sections 111, 113 as seen from the first principal surface 100ST side.

For example, as shown in FIG. 1, the second piezoelectric voltage detection sub-electrode 23A is opposed to the first piezoelectric voltage detection sub-electrode 13A in a space between the end wide section 213 of the second capacitance detection sub-electrode 21A and the end wide section 113 of the first capacitance detection sub-electrode 11A. Further, the second piezoelectric voltage detection sub-electrode 23A is opposed to the first piezoelectric voltage detection sub-electrodes 13B, 13C, respectively in spaces between the wide section 211 of the second capacitance detection sub-electrode 21A and the end wide sections 113 of the first capacitance detection sub-electrodes 11A, 11B.

It should be noted that as shown in FIG. 1, in similar manners to the above, the other place of the second piezoelectric voltage detection sub-electrode 23A is also opposed to the first piezoelectric voltage detection sub-electrodes 13D to 13L and the other second piezoelectric voltage detection sub-electrodes 23B to 23L are also respectively opposed to the first piezoelectric voltage detection sub-electrodes 13A to 13L.

The second piezoelectric voltage detection sub-electrode 23A to 23K are put together by a drawing electrode 24, and connected to the external circuit. The second capacitance detection sub-electrodes 21A to 21F are individually connected to the drawing electrodes 22A to 22F, and connected to the external circuit via the drawing electrodes 22A to 22F. These drawing electrodes 22A to 22F, 24 are formed on the outside of the formation regions for the second capacitance detection sub-electrodes 21A to 21F and the second piezoelectric voltage detection sub-electrodes 23A to 23K. Further, the drawing electrodes 22A to 22F are formed at one end of the second direction and the drawing electrode 24 is formed at the other end of the second direction.

As thus described, the principal function section 10 of the touch panel 1 is configured of the piezoelectric film 100 formed with the first capacitance detection sub-electrodes 11A to 11F, the first piezoelectric voltage detection sub-electrodes 13A to 13L, the second capacitance detection sub-electrodes 21A to 21F and the second piezoelectric voltage detection sub-electrodes 23A to 23L.

On the first principal surface 100ST side of the piezoelectric film 100 in the principal function section 10, a protective layer 30 is disposed so as to cover the entire surface of the electrode pattern forming region for the first capacitance detection sub-electrodes 11A to 11F and the first piezoelectric voltage detection sub-electrodes 13A to 13L. The protective layer 30 has insulation properties and is formed of a material having translucency. It is to be noted that, when the translucency is not required, the material is not particularly restricted so long as having the insulation properties.

On the second principal surface 100SB side of the piezoelectric film 100 in the principal function section 10, a protective layer 40 is disposed so as to cover the entire surface of the electrode pattern forming region for the second capacitance detection sub-electrodes 21A to 21F and the second piezoelectric voltage detection sub-electrodes 23A to 23L. Similarly to the protective layer 30, the protective layer 40 also has insulation properties and is formed of a material having translucency. It is to be noted that, when translucency is not required, the material is not particularly restricted so long as having the insulation properties.

Further, as for the protective layers 30, 40, polyethylene terephthalate (PET), polyethylene naphthalate (PEN), polypropylene (PP) or the like may be used, and the layers may be formed in such a shape (thickness, etc.) so as not to hamper bending of the piezoelectric film 100.

The touch panel 1 formed of the structure as described above detects a touched position and a pressed amount as shown next.

The capacitance detection drawing electrodes 12A to 12F, 22A to 22F are connected to the capacitance detection circuit. The piezoelectric voltage detection drawing electrodes 14, 24 are connected to the piezoelectric voltage detection circuit.

First, the touched position is detected on a principle as follows. It should be noted that in the configuration of the present embodiment, there has been used a detection concept for the touched position by means of a projection-type mutual capacitance system, and a detailed description of the detection concept will be omitted. Accordingly, hereinafter, the detection concept for the touched position will schematically be described.

Drive signals are applied to between the first capacitance detection sub-electrodes 11A to 11F and the second capacitance detection sub-electrodes 21A to 21F via the drawing electrodes 12A to 12F and the drawing electrodes 22A to 22F.

When the operator touches a predetermined position of the protective layer 30 with his or her finger in such a state, part of the electric field at the touched position is guided to the finger side. This brings about a change in capacitance at the touched position with respect to the time when touching with the finger is not performed. Therefore, detecting such a change in capacitance in the capacitance detection circuit enables detection of touching with the finger.

Here, the first capacitance detection sub-electrodes 11A to 11F are disposed in the extending shape along the first direction at predetermined intervals along the second direction and the second capacitance detection sub-electrodes 21A to 21F are disposed in the extending shape along the second direction at predetermined intervals along the first direction, and hence each of positions where the first capacitance detection sub-electrodes 11A to 11F and the second capacitance detection sub-electrodes 21A to 21F are opposed to each other via the piezoelectric film 100, i.e. each of positions where the electric field is generated and a current for detection flows, can be detected by a two-dimensional coordinate from combination of the first capacitance detection sub-electrode and the second capacitance detection sub-electrode that constitute the opposing position. For example, when the operator touches a place in the vicinity of the opposing position of the first capacitance detection sub-electrode 11C and the second capacitance detection sub-electrode 21D, the electric field changes in the vicinity of the opposing position, and a current flowing from the first capacitance detection sub-electrode 11C via the second capacitance detection sub-electrode 21D changes. At this time, in the other opposing places, the electric fields do not change, and currents thus do not change, either. Using such a principle allows detection of the touched position.

Further, the first capacitance detection sub-electrodes 11A to 11F and the second capacitance detection sub-electrodes 21A to 21F of the present embodiment are disposed so as to be opposed to each other in the narrow sections 112, 212 and not to be superimposed on each other in the wide sections 111, 112 as seen along the direction orthogonal to the first principal surface 100ST as the operation surface, and hence the change in electric field by touching with the finger is apt to occur with respect to both the first capacitance detection sub-electrodes 11A to 11F and the second capacitance detection sub-electrodes 21A to 21F. This can lead to improvement in detection sensitivity to touching.

Moreover, in the present embodiment, with the piezoelectric film 100 being PLLA, the permittivity that forms the capacitance is low and an influence from the outside is apt to be exerted.

This can make the change in electric field by touching with the finger more apt to occur, leading to further improvement in detection sensitivity to touching.

Figure 5A:
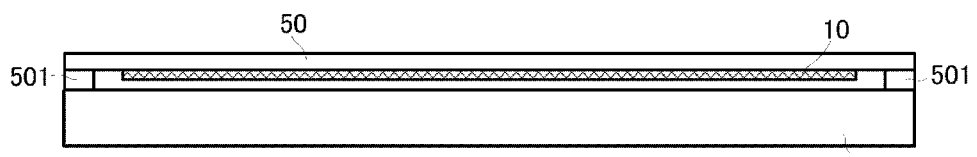
FIGS. 5A and 5B are views for explaining a pressed amount detecting function of the principal function section 10 according to the first embodiment of the present invention.
Figure 5B:
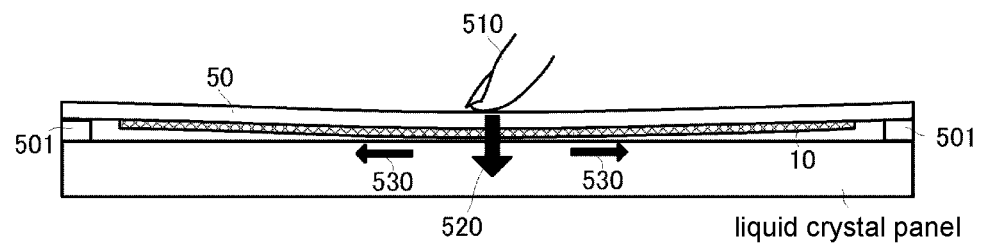
Figure 6A:
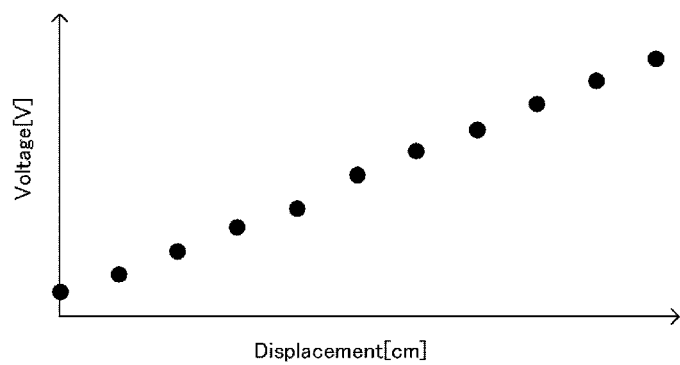
FIG. 6A is a waveform diagram of a detected voltage of an amount pressed into the principal function section 10 according to the first embodiment of the present invention.
Figure 6B:
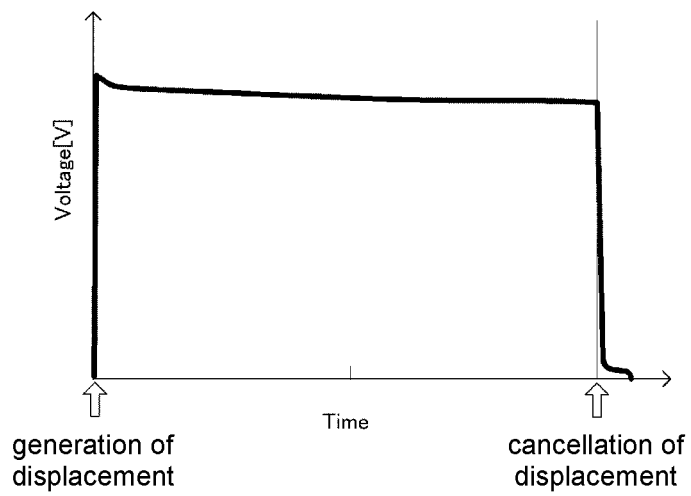
FIG. 6B is a graph illustrating the correlation between a detected voltage and a pressed amount.

Next, the detection concept for the pressed amount will be described. FIGS. 5A and 5B are views for explaining a pressed amount detecting function of the principal function section 10 according to the first embodiment of the present invention. FIG. 5A illustrates a state where no pressed force is being applied, and FIG. 5B illustrates a state where pressed force is being applied by the finger. FIG. 6A is a graph illustrating the correlation between the pressed amount and the detected voltage, and FIG. 6B is a waveform diagram of a detected voltage of an amount pressed into the principal function section 10 according to the first embodiment of the present invention.

As shown in FIG. 5A, the principal function section 10 of the touch panel 1 is mounted on one principal surface of a flat elastic body 50 such that the respective flat surfaces of those come into intimate contact with each other. The elastic body 50 is formed of glass, acrylic, polycarbonate or the like. The material for the elastic body 50 is not restricted to the materials described here, but a suitable material may be selected in accordance with use conditions. Further, also as for the surface to which the principal function section 10 of the touch panel 1 is bonded, a suitable surface may be selected in accordance with the use conditions. Both opposing ends of the elastic body 50 are supported by supports 501. That is, in the case of the touch panel 1, both ends of the touch panel 1 in the first direction are fixed. In this state, since the elastic body 50 is not bent and stress is not being applied to the piezoelectric film 100, no electric charge is generated.

As illustrated in FIG. 5B, when the surface of the elastic body 50 is pressed with a finger 510, pressed force as indicated by a thick arrow 520 is applied to the elastic body 50. In this case, the elastic body 50 is bent so as to be swollen to the surface side where the principal function section 10 is disposed. For this reason, the piezoelectric film 100 of the principal function section 10 is substantially stretched along the first direction, to generate tensile stress as indicated by thick arrows 530. By this stress, the piezoelectric film 100 is polarized into the first principal surface 100ST and the second principal surface 100SB.

Herein, the first piezoelectric voltage detection sub-electrodes 13A to 13L are formed on the first principal surface 100ST and the second piezoelectric voltage detection sub-electrodes 23A to 23L are formed on the second principal surface 100SB as described above, and hence a potential difference is generated between the first piezoelectric voltage detection sub-electrodes 13A to 13L and the second piezoelectric voltage detection sub-electrodes 23A to 23L. Accordingly, detecting this potential difference, namely a piezoelectric voltage, allows detection of pressing with the finger, i.e., touching with the finger.

Further, in PLLA, the detected voltage (piezoelectric voltage) linearly changes due to the film being stretched in accordance with the pressed amount, as illustrated in FIG. 6A. Hence the pressed amount can also be detected by measuring a detected voltage value by means of the piezoelectric voltage detection circuit. That is, it is possible to accurately detect whether the operator lightly touched or strongly pressed the operation surface. It is to be noted that the detected voltage by the piezoelectric film 100 is typically generated at the moment of generation of stress, and the detected voltage value rapidly decreases along with a leakage of electric charges due to the piezoelectric effect. However, using a detection circuit with a large input impedance, or an integration circuit, as the detection circuit for the pressed amount allows the detected voltage value to be held for predetermined time, as shown in FIG. 6B. This can lead to more reliable measurement of the detected voltage value and detection of the pressed amount. It is also possible to obtain a similar effect by integrating a signal by means of software in place of the above detection circuit with a large input impedance or the above integration circuit.

As thus described, by use of the configuration of the present embodiment, only forming the capacitance detection electrode and the piezoelectric voltage detection electrode on both opposing surfaces of one piezoelectric film 100 allows simultaneous detection of the touched position and the pressed amount (pressed force). Further, a touch panel with high translucency can be realized.

Moreover, using PLLA as the material for the piezoelectric film 100 can prevent exertion of the influence due to the pyroelectricity. Accordingly, at the time of detection, the detected voltage in accordance only with the pressed amount can be obtained without depending on a temperature of the detected position. That is, the pressed amount can be detected in a more accurate manner. Further, since PLLA is a polymer and has flexibility, it is not damaged due to large displacement as is piezoelectric ceramic. Accordingly, even when a displacement amount is large, the displacement amount can be reliably detected.

It is to be noted that, although simply disposing the protective layers 30, 40 has been described in the foregoing description, the first principal surface 100ST side of the principal function section 10 may be brought into contact with the elastic body 50, such as an acrylic plate, having a high elastic modulus as described above to dispose the protective layer 40 only on the second principal surface 100SB side.

Further, the protective layers 30, 40 may be disposed and the surface of the protective layer 40, which is on the opposite side to the principal function section 10, may be made adhesive. Moreover, this can be made weakly adhesive, thereby to realize a touch panel mountable and peelable in accordance with a place where it is used.

Figure 7:
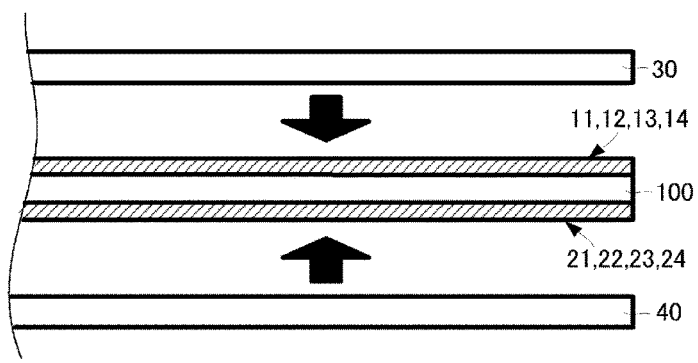
FIG. 7 is a view for explaining a first manufacturing method for the touch panel 1.
Figure 8:
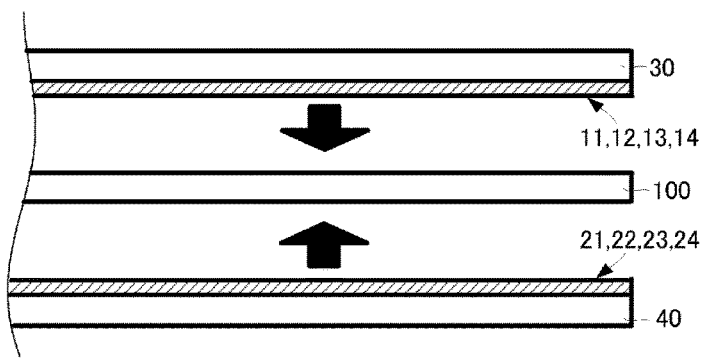
FIG. 8 is a view for explaining a second manufacturing method for the touch panel 1.

Incidentally, the touch panel 1 with the foregoing configuration can be manufactured in a manufacturing process as shown hereinafter. FIG. 7 is a view for explaining a first manufacturing method for the touch panel 1. FIG. 8 is a view for explaining a second manufacturing method for the touch panel 1. It is to be noted that in FIGS. 7 and 8, detailed electrode patterns are not illustrated, but simplified ones are illustrated.

In the first manufacturing method illustrated in FIG. 7, the first capacitance detection sub-electrodes 11A to 11F, the first piezoelectric voltage detection sub-electrodes 13A to 13L and the drawing electrodes 12A to 12F, 14 are formed on the first principal surface 100ST of the piezoelectric film 100. Next, the second capacitance detection sub-electrodes 21A to 21F, the second piezoelectric voltage detection sub-electrodes 23A to 23L and the drawing electrodes 22A to 22F, 24 are formed on the second principal surface 100SB of the piezoelectric film 100. In addition, the order of electrode formation on the first principal surface 100ST and the second principal surface 100SB may be opposite. Thereby, the principal function section 10 is configured in advance.

Subsequently, the protective layer 30 is disposed on the first principal surface 100ST side of the piezoelectric film 100 in the principal function section 10. Then, the protective layer 40 is disposed on the second principal surface 100SB side of the piezoelectric film 100 in the principal function section 10. Thereby, the touch panel 1 is formed.

In the second manufacturing method illustrated in FIG. 8, the first capacitance detection sub-electrodes 11A to 11F, the first piezoelectric voltage detection sub-electrodes 13A to 13L and the drawing electrodes 12A to 12F, 14 are formed on one principal surface of the protective layer 30. Subsequently, the second capacitance detection sub-electrodes 21A to 21F, the second piezoelectric voltage detection sub-electrodes 23A to 23L and the drawing electrodes 22A to 22F, 24 are formed on one principal surface of the protective layer 40.

Then, the protective layer 30 formed with the electrode pattern is attached to the first principal surface 100ST of the piezoelectric film 100 such that the electrode pattern surface is on the piezoelectric film 100 side. Further, the protective layer 40 formed with the electrode pattern is attached to the second principal surface 100SB of the piezoelectric film 100 such that the electrode pattern surface is on the piezoelectric film 100 side. Thereby, the touch panel 1 is formed.

In the case of using such a manufacturing method of FIG. 8 as thus described, the touch panel can be formed by a simple process as compared with the manufacturing method of FIG. 7. This is because, due to the surface of PLLA being inactive, in the case of forming the electrode pattern, the process of improving the adhesion of the electrode is required. On the other hand, when the protective layers 30, 40 are formed of PET or PEN, the electrode can be easily formed. Accordingly, by use of the manufacturing method of FIG. 7, the touch panel 1 can be more easily manufactured. Further, a transmittance of PLLA may decrease in the case of performing some treatment on the surface of PLLA, and hence in an application where importance is placed on the translucency, the manufacturing method of FIG. 8 may better be used.

Figure 9:
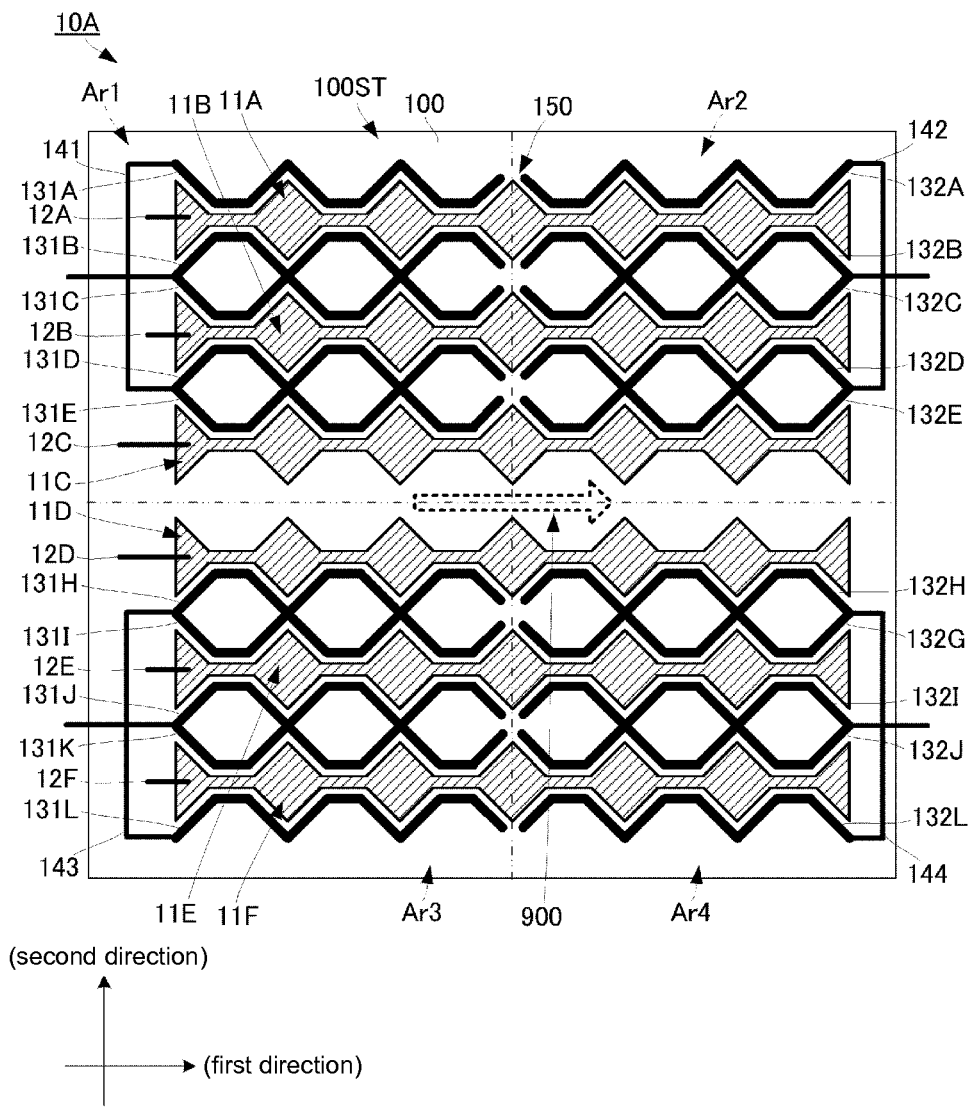
FIG. 9 is a plan view of the first principal surface 100ST of a principal function section 10A constituting a touch panel 1A according to the second embodiment of the present invention.
Figure 10:
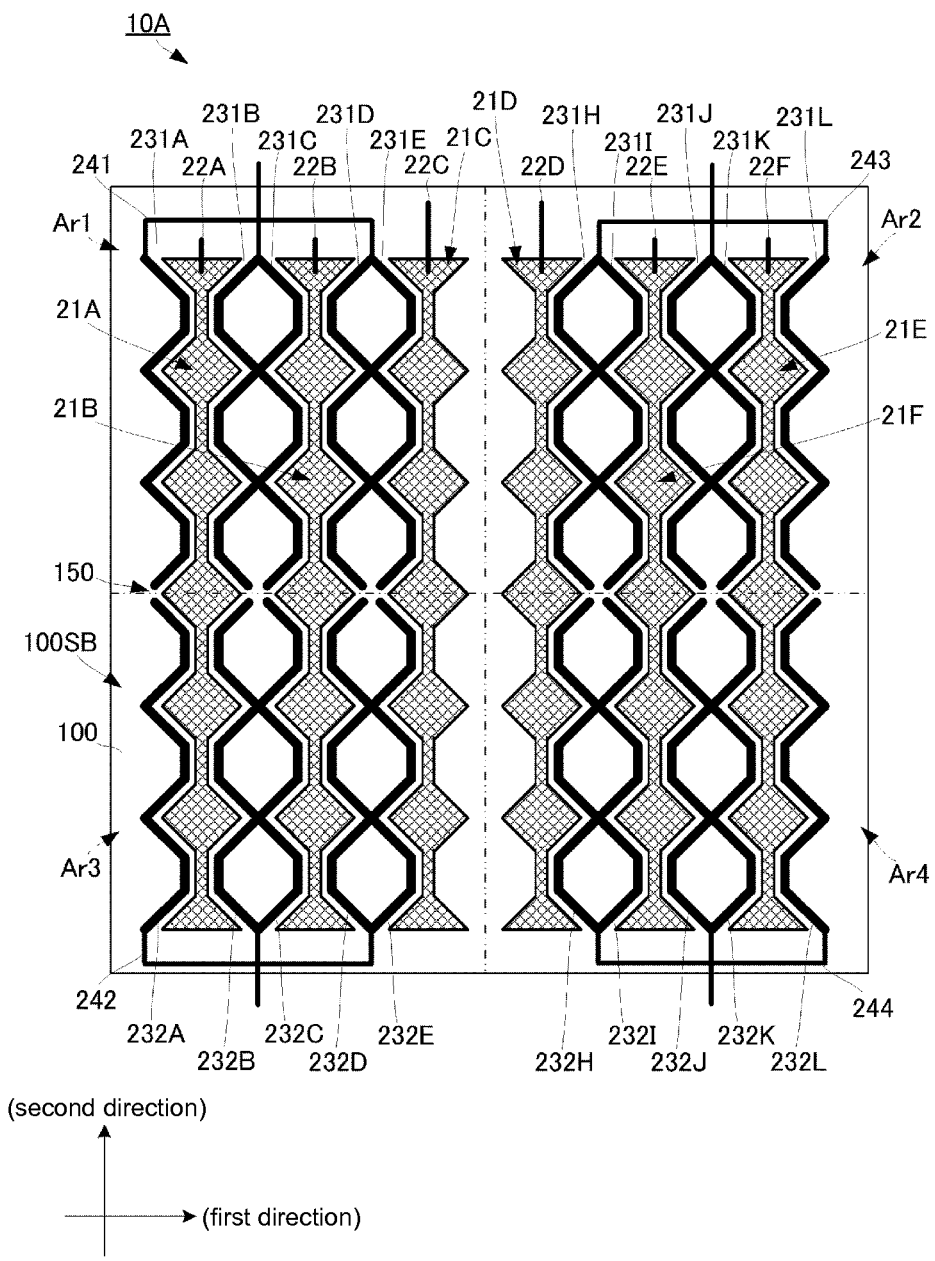
FIG. 10 is a plan view of a second principal surface 100SB of the principal function section 10A constituting the touch panel 1A according to the second embodiment of the present invention.

Next, a touch panel according to a second embodiment of the present invention will be described with reference to the drawings. FIG. 9 is a plan view of a first principal surface 100ST of a principal function section 10A constituting a touch panel 1A according to the second embodiment of the present invention. FIG. 10 is a plan view of a second principal surface 100SB of the principal function section 10A constituting the touch panel 1A according to the second embodiment of the present invention. In addition, the touch panel 1A of the present embodiment is different from the touch panel 1 shown in the first embodiment only in terms of the fixed structure, the uniaxially stretched direction of the piezoelectric film 100 and the shape of the piezoelectric voltage detection sub-electrode, and is the same as the touch panel 1 in terms of the other configurations. Accordingly, hereinafter, only the different points from the touch panel 1 shown in the first embodiment will specifically be described.

The touch panel 1A is formed of a structure where four sides of the piezoelectric film 100 are fixed. At this time, the piezoelectric film 100 is formed such that the uniaxially stretched direction 900 is orthogonal to one pair of fixed sides, and is in parallel with the other pair of fixed sides.

On the first principal surface 100ST of the piezoelectric film 100, the first capacitance detection sub-electrodes 11A to 11F are formed as shown in FIG. 9. Although the first capacitance detection sub-electrodes 11A to 11F have the same structure as in the first embodiment, those are formed such that the extending direction of the first capacitance detection sub-electrodes 11A to 11F is in parallel with the uniaxially stretched direction 900 (first direction).

First piezoelectric voltage detection sub-electrodes 131A, 132A are formed along the outer diameter shape of the first capacitance detection sub-electrode 11A on the opposite side to the first capacitance detection sub-electrode 11B, as spaced from the first capacitance detection sub-electrode 11A. The first piezoelectric voltage detection sub-electrodes 131A, 132A are separated at the midpoint along the first direction, and one end side from the separation point 150 along the first direction becomes the first piezoelectric voltage detection sub-electrodes 131A while the other end side from the separation point 150 along the first direction becomes the first piezoelectric voltage detection sub-electrodes 132A.

First piezoelectric voltage detection sub-electrodes 131B, 132B are formed along the outer diameter shape of the first capacitance detection sub-electrode 11A on the side of the first capacitance detection sub-electrode 11B, as spaced from the first capacitance detection sub-electrode 11A. The first piezoelectric voltage detection sub-electrodes 131B, 132B are separated at the midpoint along the first direction, and one end side from the separation point 150 along the first direction becomes the first piezoelectric voltage detection sub-electrodes 131B while the other end side from the separation point 150 along the first direction becomes the first piezoelectric voltage detection sub-electrodes 132B.

First piezoelectric voltage detection sub-electrodes 131C, 132C are formed along the outer diameter shape of the first capacitance detection sub-electrode 11B on the side of the first capacitance detection sub-electrode 11A, as spaced from the first capacitance detection sub-electrode 11B. The first piezoelectric voltage detection sub-electrodes 131C, 132C are separated at the midpoint along the first direction, and one end side from the separation point 150 along the first direction becomes the first piezoelectric voltage detection sub-electrodes 131C while the other end side from the separation point 150 along the first direction becomes the first piezoelectric voltage detection sub-electrodes 132C.

The first piezoelectric voltage detection sub-electrodes 131B, 131C are connected to each other in the vicinities of corner sections of the wide section 111 and the end wide section 113 of the first capacitance detection sub-electrode. The first piezoelectric voltage detection sub-electrodes 132B, 132C are connected to each other in the vicinities of corner sections of the wide section 111 and the end wide section 113 of the first capacitance detection sub-electrode.

First piezoelectric voltage detection sub-electrodes 131D, 132D are formed along the outer diameter shape of the first capacitance detection sub-electrode 11B on the side of the first capacitance detection sub-electrode 11C, as spaced from the first capacitance detection sub-electrode 11B. The first piezoelectric voltage detection sub-electrodes 131D, 132D are separated at the midpoint along the first direction, and one end side from the separation point 150 along the first direction becomes the first piezoelectric voltage detection sub-electrodes 131D while the other end side from the separation point 150 along the first direction becomes the first piezoelectric voltage detection sub-electrodes 132D.

First piezoelectric voltage detection sub-electrodes 131E, 132E are formed along the outer diameter shape of the first capacitance detection sub-electrode 11C on the side of the first capacitance detection sub-electrode 11B, as spaced from the first capacitance detection sub-electrode 11C. The first piezoelectric voltage detection sub-electrodes 131E, 132E are separated at the midpoint along the first direction, and one end side from the separation point 150 along the first direction becomes the first piezoelectric voltage detection sub-electrodes 131E while the other end side from the separation point 150 along the first direction becomes the first piezoelectric voltage detection sub-electrodes 132E.

The first piezoelectric voltage detection sub-electrodes 131D, 131E are connected to each other in the vicinities of corner sections of the wide section 111 and the end wide section 113 of the first capacitance detection sub-electrode. The first piezoelectric voltage detection sub-electrodes 132D, 132E are connected to each other in the vicinities of corner sections of the wide section 111 and the end wide section 113 of the first capacitance detection sub-electrode.

The first piezoelectric voltage detection sub-electrodes 131A, 131B, 131C, 131D, 131E are put together by a drawing electrode 141, and connected to the external circuit from the one end side of the piezoelectric film 100 in the first direction. The first piezoelectric voltage detection sub-electrodes 132A, 132B, 132C, 132D, 132E are put together by a drawing electrode 142, and connected to the external circuit from the other end side of the piezoelectric film 100 in the first direction.

The piezoelectric voltage detection sub-electrode is not formed between the first capacitance detection sub-electrode 11C and the first capacitance detection sub-electrode 11D, as a center region of the first principal surface 100ST along the second direction.

First piezoelectric voltage detection sub-electrodes 131H, 132H are formed along the outer diameter shape of the first capacitance detection sub-electrode 11D on the side of the first capacitance detection sub-electrode 11E, as spaced from the first capacitance detection sub-electrode 11D. The piezoelectric voltage detection sub-electrodes 131H, 132H are separated at the midpoint along the first direction, and one end side from the separation point 150 along the first direction becomes the first piezoelectric voltage detection sub-electrodes 131H while the other end side from the separation point 150 along the first direction becomes the first piezoelectric voltage detection sub-electrodes 132H.

First piezoelectric voltage detection sub-electrodes 131I, 132I are formed along the outer diameter shape of the first capacitance detection sub-electrode 11E on the side of the first capacitance detection sub-electrode 11D, as spaced from the first capacitance detection sub-electrode 11E. The first piezoelectric voltage detection sub-electrodes 131I, 132I are separated at the midpoint along the first direction, and one end side from the separation point 150 along the first direction becomes the first piezoelectric voltage detection sub-electrodes 131I while the other end side from the separation point 150 along the first direction becomes the first piezoelectric voltage detection sub-electrodes 132I.

The first piezoelectric voltage detection sub-electrodes 131H, 131I are connected to each other in the vicinities of corner sections of the wide section 111 and the end wide section 113 of the first capacitance detection sub-electrode. The first piezoelectric voltage detection sub-electrodes 132H, 132I are connected to each other in the vicinities of corner sections of the wide section 111 and the end wide section 113 of the first capacitance detection sub-electrode.

First piezoelectric voltage detection sub-electrodes 131J, 132J are formed along the outer diameter shape of the first capacitance detection sub-electrode 11E on the side of the first capacitance detection sub-electrode 11F, as spaced from the first capacitance detection sub-electrode 11E. The first piezoelectric voltage detection sub-electrodes 131J, 132J are separated at the midpoint along the first direction, and one end side from the separation point 150 along the first direction becomes the first piezoelectric voltage detection sub-electrodes 131J while the other end side from the separation point 150 along the first direction becomes the first piezoelectric voltage detection sub-electrodes 132J.

First piezoelectric voltage detection sub-electrodes 131K, 132K are formed along the outer diameter shape of the first capacitance detection sub-electrode 11F on the side of the first capacitance detection sub-electrode 11E, as spaced from the first capacitance detection sub-electrode 11F. The first piezoelectric voltage detection sub-electrodes 131K, 132K are separated at the midpoint along the first direction, and one end side from the separation point 150 along the first direction becomes the first piezoelectric voltage detection sub-electrodes 131K while the other end side from the separation point 150 along the first direction becomes the first piezoelectric voltage detection sub-electrodes 132K.

The first piezoelectric voltage detection sub-electrodes 131J, 131K are connected to each other in the vicinities of corner sections of the wide section 111 and the end wide section 113 of the first capacitance detection sub-electrode. The first piezoelectric voltage detection sub-electrodes 132J, 132K are connected to each other in the vicinities of corner sections of the wide section 111 and the end wide section 113 of the first capacitance detection sub-electrode.

First piezoelectric voltage detection sub-electrodes 131L, 132L are formed along the outer diameter shape of the first capacitance detection sub-electrode 11F on the opposite side to the first capacitance detection sub-electrode 11E, as spaced from the first capacitance detection sub-electrode 11F. The piezoelectric voltage detection sub-electrodes 131L, 132L are separated at the midpoint along the first direction, and one end side from the separation point 150 along the first direction becomes the first piezoelectric voltage detection sub-electrodes 131L while the other end side from the separation point 150 along the first direction becomes the first piezoelectric voltage detection sub-electrodes 132L.

The first piezoelectric voltage detection sub-electrodes 131H, 131I, 131J, 131K, 131L are put together by a drawing electrode 143, and connected to the external circuit from the one end side of the piezoelectric film 100 in the first direction. The first piezoelectric voltage detection sub-electrodes 132H, 132I, 132J, 132K, 132L are put together by a drawing electrode 144, and connected to the external circuit from the other end side of the piezoelectric film 100 in the first direction.

On the second principal surface 100SB of the piezoelectric film 100, the second capacitance detection sub-electrodes 21A to 21F are formed as shown in FIG. 10. Although the second capacitance detection sub-electrodes 21A to 21F have the same structure as in the first embodiment, those are formed such that the extending direction of the first capacitance detection sub-electrodes 21A to 21F is orthogonal to the uniaxially stretched direction 900.

Second piezoelectric voltage detection sub-electrodes 231A, 232A are formed along the outer diameter shape of the second capacitance detection sub-electrode 21A on the opposite side to the second capacitance detection sub-electrode 21B, as spaced from the second capacitance detection sub-electrode 21A. The second piezoelectric voltage detection sub-electrodes 231A, 232A are separated at the midpoint along the second direction, and one end side from the separation point 150 along the second direction becomes the second piezoelectric voltage detection sub-electrodes 231A while the other end side from the separation point 150 along the second direction becomes the second piezoelectric voltage detection sub-electrodes 232A.

Second piezoelectric voltage detection sub-electrodes 231B, 232B are formed along the outer diameter shape of the second capacitance detection sub-electrode 21A on the side of the second capacitance detection sub-electrode 21B, as spaced from the second capacitance detection sub-electrode 21A. The second piezoelectric voltage detection sub-electrodes 231B, 232B are separated at the midpoint along the second direction, and one end side from the separation point 150 along the second direction becomes the second piezoelectric voltage detection sub-electrodes 231B while the other end side from the separation point 150 along the second direction becomes the second piezoelectric voltage detection sub-electrodes 232B.

Second piezoelectric voltage detection sub-electrodes 231C, 232C are formed along the outer diameter shape of the second capacitance detection sub-electrode 21B on the side of the second capacitance detection sub-electrode 21A, as spaced from the second capacitance detection sub-electrode 21B. The second piezoelectric voltage detection sub-electrodes 231C, 232C are separated at the midpoint along the second direction, and one end side from the separation point 150 along the second direction becomes the second piezoelectric voltage detection sub-electrodes 231C while the other end side from the separation point 150 along the second direction becomes the second piezoelectric voltage detection sub-electrodes 232C.

The second piezoelectric voltage detection sub-electrodes 231B, 231C are connected to each other in the vicinities of corner sections of the wide section 211 and the end wide section 213 of the second capacitance detection sub-electrode. The second piezoelectric voltage detection sub-electrodes 232B, 232C are connected to each other in the vicinities of corner sections of the wide section 211 and the end wide section 213 of the second capacitance detection sub-electrode.

Second piezoelectric voltage detection sub-electrodes 231D, 232D are formed along the outer diameter shape of the second capacitance detection sub-electrode 21B on the side of the second capacitance detection sub-electrode 21C, as spaced from the second capacitance detection sub-electrode 21B. The second piezoelectric voltage detection sub-electrodes 231D, 232D are separated at the midpoint along the second direction, and one end side from the separation point 150 along the second direction becomes the second piezoelectric voltage detection sub-electrodes 231D while the other end side from the separation point 150 along the second direction becomes the second piezoelectric voltage detection sub-electrodes 232D.

Second piezoelectric voltage detection sub-electrodes 231E, 232E are formed along the outer diameter shape of the second capacitance detection sub-electrode 21C on the side of the second capacitance detection sub-electrode 21B, as spaced from the second capacitance detection sub-electrode 21C. The second piezoelectric voltage detection sub-electrodes 231E, 232E are separated at the midpoint along the second direction, and one end side from the separation point 150 along the second direction becomes the second piezoelectric voltage detection sub-electrodes 231E while the other end side from the separation point 150 along the second direction becomes the second piezoelectric voltage detection sub-electrodes 232E.

The second piezoelectric voltage detection sub-electrodes 231D, 231E are connected to each other in the vicinities of corner sections of the wide section 211 and the end wide section 213 of the second capacitance detection sub-electrode. The second piezoelectric voltage detection sub-electrodes 232D, 232E are connected to each other in the vicinities of corner sections of the wide section 211 and the end wide section 213 of the second capacitance detection sub-electrode.

The second piezoelectric voltage detection sub-electrodes 231A, 231B, 231C, 231D, 231E are put together by a drawing electrode 241, and connected to the external circuit from the one end side of the piezoelectric film 100 in the second direction. The second piezoelectric voltage detection sub-electrodes 232A, 232B, 232C, 232D, 232E are put together by a drawing electrode 242, and connected to the external circuit from the other end side of the piezoelectric film 100 in the second direction.

The piezoelectric voltage detection sub-electrode is not formed between the second capacitance detection sub-electrode 21C and the second capacitance detection sub-electrode 21D, as a center region of the second principal surface 100SB along the first direction.

Second piezoelectric voltage detection sub-electrodes 231H, 232H are formed along the outer diameter shape of the second capacitance detection sub-electrode 21D on the side of the second capacitance detection sub-electrode 21E, as spaced from the second capacitance detection sub-electrode 21D. The second piezoelectric voltage detection sub-electrodes 231H, 232H are separated at the midpoint along the second direction, and one end side from the separation point 150 along the second direction becomes the second piezoelectric voltage detection sub-electrodes 231H while the other end side from the separation point 150 along the second direction becomes the second piezoelectric voltage detection sub-electrodes 232H.

Second piezoelectric voltage detection sub-electrodes 231I, 232I are formed along the outer diameter shape of the second capacitance detection sub-electrode 21E on the side of the second capacitance detection sub-electrode 21D, as spaced from the second capacitance detection sub-electrode 21E. The second piezoelectric voltage detection sub-electrodes 231I, 232I are separated at the midpoint along the second direction, and one end side from the separation point 150 along the second direction becomes the second piezoelectric voltage detection sub-electrodes 231I while the other end side from the separation point 150 along the second direction becomes the second piezoelectric voltage detection sub-electrodes 232I.

The second piezoelectric voltage detection sub-electrodes 231H, 231I are connected to each other in the vicinities of corner sections of the wide section 211 and the end wide section 213 of the second capacitance detection sub-electrode. The second piezoelectric voltage detection sub-electrodes 232H, 232I are connected to each other in the vicinities of corner sections of the wide section 211 and the end wide section 213 of the second capacitance detection sub-electrode.

Second piezoelectric voltage detection sub-electrodes 231J, 232J are formed along the outer diameter shape of the second capacitance detection sub-electrode 21E on the side of the second capacitance detection sub-electrode 21F, as spaced from the second capacitance detection sub-electrode 21E. The second piezoelectric voltage detection sub-electrodes 231J, 232J are separated at the midpoint along the second direction, and one end side from the separation point 150 along the second direction becomes the second piezoelectric voltage detection sub-electrodes 231J while the other end side from the separation point 150 along the second direction becomes the second piezoelectric voltage detection sub-electrodes 232J.

Second piezoelectric voltage detection sub-electrodes 231K, 232K are formed along the outer diameter shape of the second capacitance detection sub-electrode 21F on the side of the second capacitance detection sub-electrode 21E, as spaced from the second capacitance detection sub-electrode 21F. The second piezoelectric voltage detection sub-electrodes 231K, 232K are separated at the midpoint along the second direction, and one end side from the separation point 150 along the second direction becomes the second piezoelectric voltage detection sub-electrodes 231K while the other end side from the separation point 150 along the second direction becomes the second piezoelectric voltage detection sub-electrodes 232K.

The second piezoelectric voltage detection sub-electrodes 231J, 231K are connected to each other in the vicinities of corner sections of the wide section 211 and the end wide section 213 of the second capacitance detection sub-electrode. The second piezoelectric voltage detection sub-electrodes 232J, 232K are connected to each other in the vicinities of corner sections of the wide section 211 and the end wide section 213 of the second capacitance detection sub-electrode.

Second piezoelectric voltage detection sub-electrodes 231L, 232L are formed along the outer diameter shape of the second capacitance detection sub-electrode 21F on the opposite side to the second capacitance detection sub-electrode 21E, as spaced from the second capacitance detection sub-electrode 21F. The second piezoelectric voltage detection sub-electrodes 231L, 232L are separated at the midpoint along the second direction, and one end side from the separation point 150 along the first direction becomes the second piezoelectric voltage detection sub-electrodes 231L while the other end side from the separation point 150 along the first direction becomes the second piezoelectric voltage detection sub-electrodes 232L.

The second piezoelectric voltage detection sub-electrodes 231H, 231I, 231J, 231K, 231L are put together by a drawing electrode 243, and connected to the external circuit from the one end side of the piezoelectric film 100 in the second direction. The second piezoelectric voltage detection sub-electrodes 232H, 232I, 232J, 232K, 232L are put together by a drawing electrode 244, and connected to the external circuit from the other end side of the piezoelectric film 100 in the second direction.

With such a configuration formed, a piezoelectric voltage which is generated in the piezoelectric film 100 can be individually detected in four partial regions Ar1, Ar2, Ar3, Ar4, divided with two division lines orthogonal to each other at the center of the piezoelectric film 100 as seen from the direction orthogonal to the first principal surface 100ST.

A piezoelectric voltage in the first partial region Ar1 can be detected by a group of the first piezoelectric voltage detection sub-electrodes 131A, 131B, 131C, 131D, 131E on the first principal surface 100ST and the second piezoelectric voltage detection sub-electrodes 231A, 231B, 231C, 231D, 231E on the second principal surface 100SB.

A piezoelectric voltage in the second partial region Ar2 can be detected by a group of the first piezoelectric voltage detection sub-electrodes 132A, 132B, 132C, 132D, 132E on the first principal surface 100ST and the second piezoelectric voltage detection sub-electrodes 231H, 231I, 231J, 231K, 231L on the second principal surface 100SB.

A piezoelectric voltage in the third partial region Ar3 can be detected by a group of the first piezoelectric voltage detection sub-electrodes 131H, 131I, 131J, 131K, 131L on the first principal surface 100ST and the second piezoelectric voltage detection sub-electrodes 232A, 232B, 232C, 232D, 232E on the second principal surface 100SB.

A piezoelectric voltage in the fourth partial region Ar4 can be detected by a group of the first piezoelectric voltage detection sub-electrodes 132H, 132I, 132J, 132K, 132L on the first principal surface 100ST and the second piezoelectric voltage detection sub-electrodes 232H, 232I, 232J, 232K, 232L on the second principal surface 100SB.

By setting the partial regions Ar1, Ar2, Ar3, Ar4 formed of the configuration as thus described, each of the partial regions Ar1, Ar2, Ar3, Ar4 is structured such that two orthogonal sides are fixed while the other two sides can be bent in the direction orthogonal to the principal surface. For this reason, when the operator presses the operation surface (first principal surface side) with his or her finger, each of the partial regions Ar1, Ar2, Ar3, Ar4 is displaced so as to be extended (or shrunk) in both directions along roughly a diagonal line of the foregoing two orthogonal sides. Herein, the uniaxially stretched direction of the piezoelectric film 100 is in parallel with the first direction as described above, and hence a piezoelectric voltage by such displacement can be effectively detected in each of the partial regions Ar1, Ar2, Ar3, Ar4.

Since the piezoelectric voltage in each of these partial regions Ar1, Ar2, Ar3, Ar4 is a different value depending on the pressed amount, these piezoelectric voltages are combined and an arithmetic operation is performed, thereby allowing detection of the pressed amount as the touch panel 1A.

For example, when positive potentials are detected in the first piezoelectric voltage detection sub-electrodes 131A, 131B, 131C, 131D, 131E on the first principal surface 100ST in the first partial region Ar1, negative potentials are detected in the first piezoelectric voltage detection sub-electrodes 132A, 132B, 132C, 132D, 132E on the first principal surface 100ST in the second partial region Ar2, negative potentials are detected in the first piezoelectric voltage detection sub-electrodes 131H, 131I, 131J, 131K, 131L on the first principal surface 100ST in the third partial region Ar3, and positive potentials are detected in the first piezoelectric voltage detection sub-electrodes 132H, 132I, 132J, 132K, 132L on the first principal surface 100ST in the fourth partial region Ar4. This relation of the signs of the generated potentials is almost constant regardless of the pressed position. It is selectable as appropriate whether the voltages generated in the four regions are connected in a parallel relation or connected in a serial relation, and either may be selected depending on performance or use conditions of a sensing circuit. For example, the parallel connection is preferred in the case of placing importance on an amount of generated electric charges, and the serial connection may be used in the case of placing importance on a size of a generated potential.

As thus described, by use of the configuration of the present embodiment, it is possible to detect the touched position as well as the pressed amount even in the aspect where the four sides of the piezoelectric film 100 are fixed.

Figure 11:
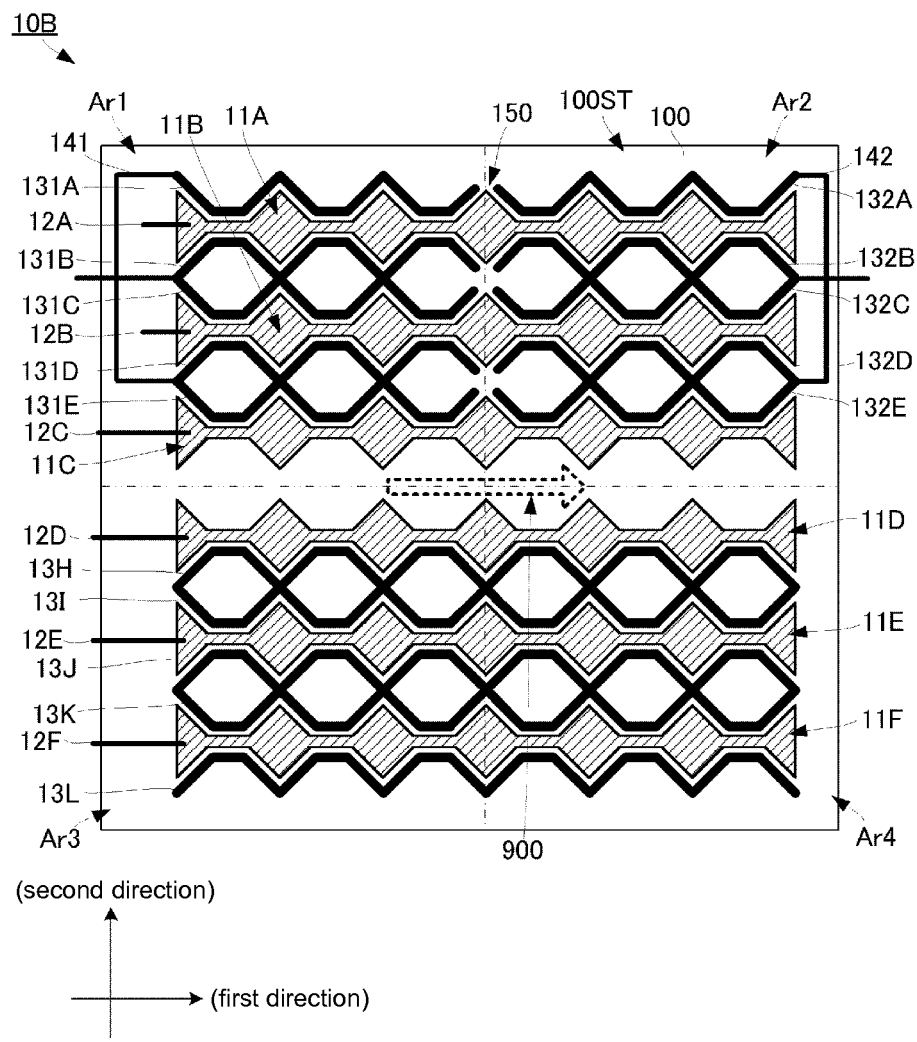
FIG. 11 is a plan view of the first principal surface 100ST of a principal function section 10B constituting a touch panel 1B according to a third embodiment of the present invention.
Figure 12:
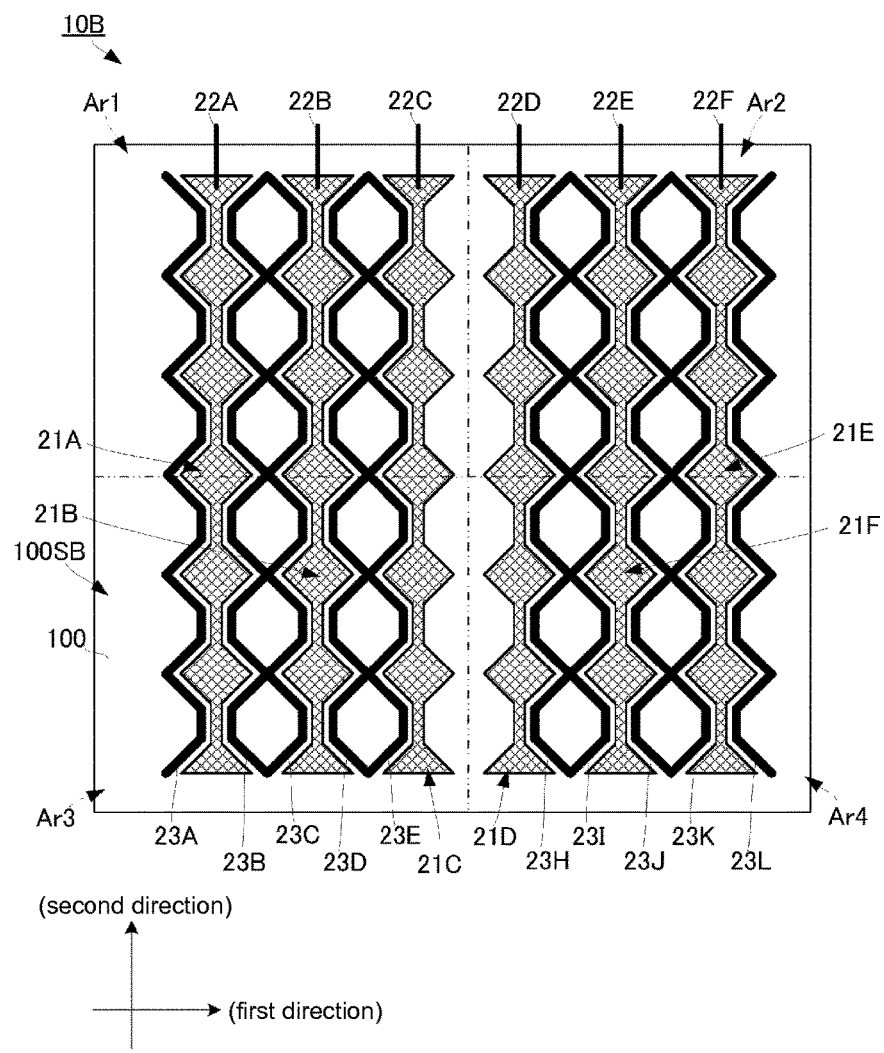
FIG. 12 is a plan view of the second principal surface 100SB of the principal function section 10B constituting the touch panel 1B according to the third embodiment of the present invention.

Next, a touch panel according to a third embodiment will be described with reference to the drawings. FIG. 11 is a plan view of the first principal surface 100ST of a principal function section 10B constituting a touch panel 1B according to the third embodiment of the present invention. FIG. 12 is a plan view of the second principal surface 100SB of the principal function section 10B constituting the touch panel 1B according to the third embodiment of the present invention. In addition, the touch panel 1B of the present embodiment is different from the touch panel 1A shown in the second embodiment only in terms of the shape of the piezoelectric voltage detection sub-electrode, and is the same as the touch panel 1A in terms of the other configurations. Accordingly, hereinafter, only the different point from the touch panel 1A shown in the second embodiment will specifically be described.

In the present embodiment, on the first principal surface 100ST of the piezoelectric film 100, the first piezoelectric voltage detection sub-electrode 131H and the first piezoelectric voltage detection sub-electrode 132H in the second embodiment are connected to each other, and the first piezoelectric voltage detection sub-electrode 13H extending along the first direction is provided as in the first embodiment. The first piezoelectric voltage detection sub-electrode 131I and the first piezoelectric voltage detection sub-electrode 132I in the second embodiment are connected to each other, and the first piezoelectric voltage detection sub-electrode 13I extending along the first direction is provided as in the first embodiment. The first piezoelectric voltage detection sub-electrode 131J and the first piezoelectric voltage detection sub-electrode 132J in the second embodiment are connected to each other, and the first piezoelectric voltage detection sub-electrode 13J extending along the first direction is provided as in the first embodiment. The first piezoelectric voltage detection sub-electrode 131K and the first piezoelectric voltage detection sub-electrode 132K in the second embodiment are connected to each other, and the first piezoelectric voltage detection sub-electrode 13K extending along the first direction is provided as in the first embodiment. The first piezoelectric voltage detection sub-electrode 131L and the first piezoelectric voltage detection sub-electrode 132L in the second embodiment are connected to each other, and the first piezoelectric voltage detection sub-electrode 13L extending along the first direction is provided as in the first embodiment.

Drawing electrodes connected to the first piezoelectric voltage detection sub-electrodes 13H, 13I, 13J, 13K, 13L are not formed.

On the second principal surface 100SB, the second piezoelectric voltage detection sub-electrode 231A and the second piezoelectric voltage detection sub-electrode 232A in the second embodiment are connected to each other, and the second piezoelectric voltage detection sub-electrode 23A extending along the second direction is provided as in the first embodiment. The second piezoelectric voltage detection sub-electrode 231B and the second piezoelectric voltage detection sub-electrode 232B in the second embodiment are connected to each other, and the second piezoelectric voltage detection sub-electrode 23B extending along the second direction is provided as in the first embodiment. The second piezoelectric voltage detection sub-electrode 231C and the second piezoelectric voltage detection sub-electrode 232C in the second embodiment are connected to each other, and the second piezoelectric voltage detection sub-electrode 23C extending along the second direction is provided as in the first embodiment. The second piezoelectric voltage detection sub-electrode 231D and the second piezoelectric voltage detection sub-electrode 232D in the second embodiment are connected to each other, and the second piezoelectric voltage detection sub-electrode 23D extending along the second direction is provided as in the first embodiment. The second piezoelectric voltage detection sub-electrode 231E and the second piezoelectric voltage detection sub-electrode 232E in the second embodiment are connected to each other, and the second piezoelectric voltage detection sub-electrode 23E extending along the second direction is provided as in the first embodiment.

Further, on the second principal surface 100SB, the second piezoelectric voltage detection sub-electrode 231H and the second piezoelectric voltage detection sub-electrode 232H in the second embodiment are connected to each other, and the second piezoelectric voltage detection sub-electrode 23H extending along the second direction is provided as in the first embodiment. The second piezoelectric voltage detection sub-electrode 231I and the second piezoelectric voltage detection sub-electrode 232I in the second embodiment are connected to each other, and the second piezoelectric voltage detection sub-electrode 23I extending along the second direction is provided as in the first embodiment. The second piezoelectric voltage detection sub-electrode 231J and the second piezoelectric voltage detection sub-electrode 232J in the second embodiment are connected to each other, and the second piezoelectric voltage detection sub-electrode 23J extending along the second direction is provided as in the first embodiment. The second piezoelectric voltage detection sub-electrode 231K and the second piezoelectric voltage detection sub-electrode 232K in the second embodiment are connected to each other, and the second piezoelectric voltage detection sub-electrode 23K extending along the second direction is provided as in the first embodiment. The second piezoelectric voltage detection sub-electrode 231L and the second piezoelectric voltage detection sub-electrode 232L in the second embodiment are connected to each other, and the second piezoelectric voltage detection sub-electrode 23L extending along the second direction is provided as in the first embodiment.

Drawing electrodes connected to the second piezoelectric voltage detection sub-electrodes 23A, 23B, 23C, 23D, 23E, 23H, 23I, 23J, 23K, 23L are not formed.

In such a configuration, the piezoelectric voltage detection electrode pattern in the first partial region Ar1 and the piezoelectric voltage detection electrode pattern in the third partial region Ar3 are connected to each other on the second principal surface 100SB side. The piezoelectric voltage detection electrode pattern in the third partial region Ar3 and the piezoelectric voltage detection electrode pattern in the fourth partial region Ar4 are connected to each other on the first principal surface 100ST side. The piezoelectric voltage detection electrode pattern in the fourth partial region Ar4 and the piezoelectric voltage detection electrode pattern in the second partial region Ar2 are connected to each other on the second principal surface 100SB side.

Hence there can be realized a structure where the piezoelectric voltage detection electrode patterns in the respective partial regions Ar1, Ar2, Ar3, Ar4 are connected in series. That is, it is possible to realize a circuit for sequentially adding piezoelectric voltages detected in the respective partial regions Ar1, Ar2, Ar3, Ar4 without forming a drawing electrode different from the detection electrode. It is thereby possible to form, with a reduced size, the touch panel having the circuit as thus described which sequentially adds piezoelectric voltages detected in the respective partial regions Ar1, Ar2, Ar3, Ar4.

Figure 13:
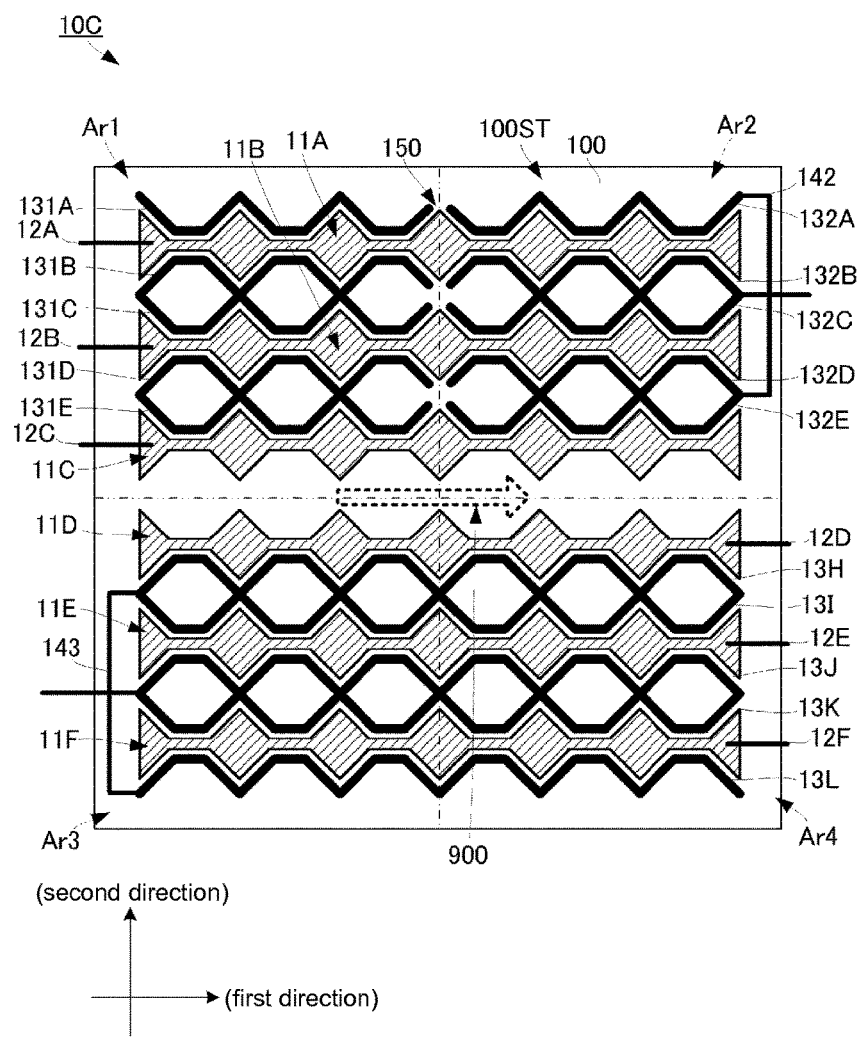
FIG. 13 is a plan view of the first principal surface 100ST of a principal function section 10C constituting a touch panel 1C according to a fourth embodiment of the present invention.
Figure 14:
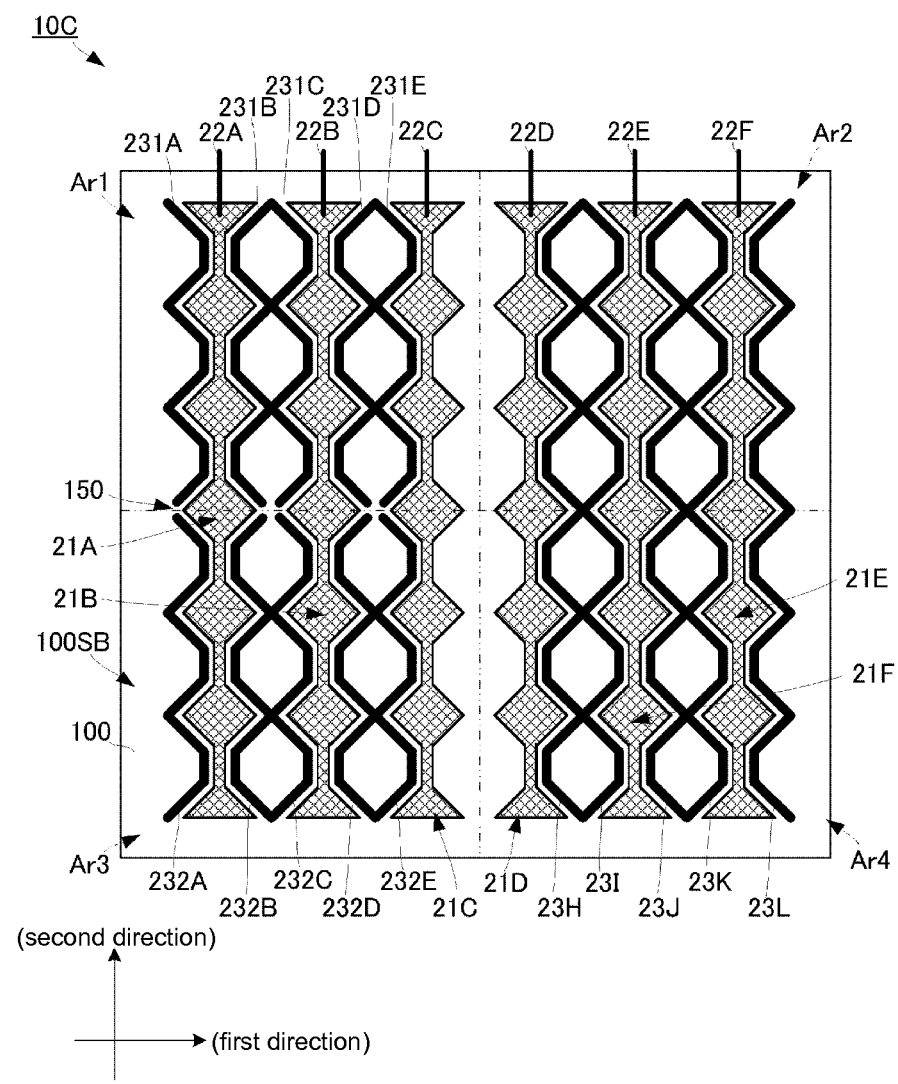
FIG. 14 is a plan view of the second principal surface 100SB of the principal function section 10C constituting the touch panel 1C according to the fourth embodiment of the present invention.

Next, a touch panel according to a fourth embodiment will be described with reference to the drawings. FIG. 13 is a plan view of the first principal surface 100ST of a principal function section 10C constituting a touch panel 1C according to a fourth embodiment of the present invention. FIG. 14 is a plan view of the second principal surface 100SB of the principal function section 10C constituting the touch panel 1C according to the fourth embodiment of the present invention.

The touch panel 1C of the present embodiment is different from the touch panel 1B shown in the third embodiment only in terms of the shape of the piezoelectric voltage detection sub-electrode and the pattern of the drawing electrode, and is the same as the touch panel 1B in terms of the other configurations. Accordingly, hereinafter, only the different points from the touch panel 1B shown in the third embodiment will specifically be described.

On the first principal surface 100ST of the piezoelectric film 100, drawing electrodes are not formed in the first piezoelectric voltage detection sub-electrodes 131A, 131B, 131C, 131D, 131E formed in the first partial region Ar1.

The piezoelectric voltage detection sub-electrode 13H, 13I, 13J, 13K 13L are put together by a drawing electrode 143, and connected to the external circuit. The drawing electrode 143 is formed at the end of the first principal surface 100ST on the third partial region Ar3 side in the first direction.

In accordance with this configuration, the drawing electrodes 12D, 12E, 12F respectively connected to the first capacitance detection sub-electrodes 11D, 11E, 11F are formed at the end of the first principal surface 100ST on the fourth partial region Ar4 side in the first direction.

On the second principal surface 100SB of the piezoelectric film 100, as in the configuration of the second embodiment, the second piezoelectric voltage detection sub-electrode 231A formed in the first partial region Ar1 and the second piezoelectric voltage detection sub-electrode 232A formed in the third partial region Ar3 are separated at the separation point 150. The second piezoelectric voltage detection sub-electrode 231B formed in the first partial region Ar1 and the second piezoelectric voltage detection sub-electrode 232B formed in the third partial region Ar3 are separated at the separation point 150. The second piezoelectric voltage detection sub-electrode 231C formed in the first partial region Ar1 and the second piezoelectric voltage detection sub-electrode 232C formed in the third partial region Ar3 are separated at the separation point 150. The second piezoelectric voltage detection sub-electrode 231D formed in the first partial region Ar1 and the second piezoelectric voltage detection sub-electrode 232D formed in the third partial region Ar3 are separated at the separation point 150. The second piezoelectric voltage detection sub-electrode 231E formed in the first partial region Ar1 and the second piezoelectric voltage detection sub-electrode 232E formed in the third partial region Ar3 are separated at the separation point 150. It is to be noted that these may be structured so as not to be separated as shown in the third embodiment.

In such a configuration, the piezoelectric voltage detection electrode pattern in the third partial region Ar3 and the piezoelectric voltage detection electrode pattern in the fourth partial region Ar4 are connected to each other on the first principal surface 100ST side. The piezoelectric voltage detection electrode pattern in the fourth partial region Ar4 and the piezoelectric voltage detection electrode pattern in the second partial region Ar2 are connected to each other on the second principal surface 100SB side.

Hence there can be realized a structure where the piezoelectric voltage detection electrode patterns in the respective partial regions Ar2, Ar3, Ar4 are connected in series. That is, it is possible to realize a circuit for sequentially adding voltages detected in the respective partial regions Ar2, Ar3, Ar4 without forming a drawing electrode different from the detection electrode. It is thereby possible to form, with a reduced size, the touch panel having the circuit as thus described which sequentially adds piezoelectric voltages detected in the respective partial regions Ar2, Ar3, Ar4.

It is to be noted that, although a piezoelectric voltage cannot be detected in the first partial region Ar1 in the configuration of the present embodiment, when the first partial region Ar1 is pressed with the finger or the like, the second, third and fourth partial regions Ar2, Ar3, Ar4 are also displaced in accordance with displacement of the first partial region Ar1. Therefore, when piezoelectric voltages in the second, third and fourth partial regions Ar2, Ar3, Ar4 are acquired, a pressed amount as the piezoelectric film 100 can be detected even though the piezoelectric voltage in the first partial region Ar1 cannot be acquired.

As thus described, by use of the configuration of the present embodiment, on the first principal surface 100ST, the drawing electrodes 12A to 12C connected to the first capacitance detection sub-electrodes 11A to 11C, the drawing electrodes 12D to 12F connected to the first capacitance detection sub-electrodes 11D to 11F, the drawing electrode 142 connected to the first piezoelectric voltage detection sub-electrodes 132A to 132E and the drawing electrode 143 connected to the first piezoelectric voltage detection sub-electrodes 13H to 13L can be formed in the respectively different partial regions. For this reason, connection to the external circuit is possible without making each drawing electrode intersect with one another. This can facilitate formation of a drawing pattern and structure of the drawing electrodes, so as to further facilitate manufacturing of the touch panel.

Figure 15:
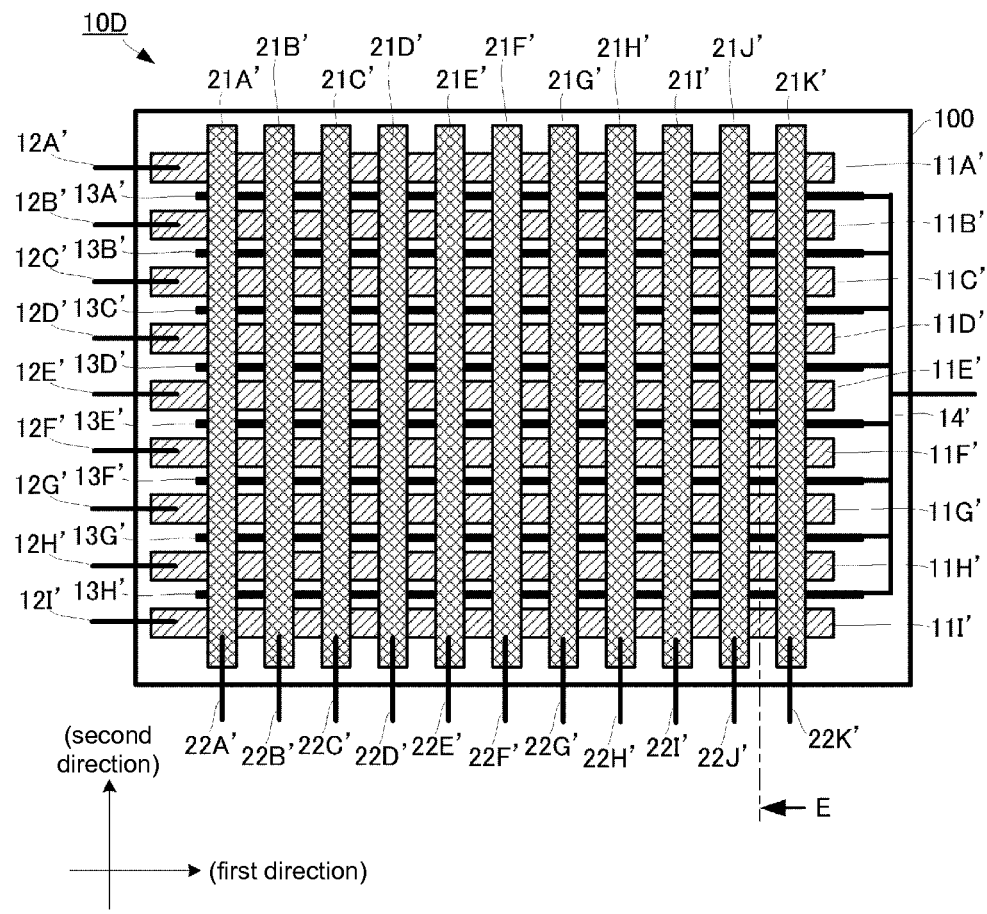
FIG. 15 is a plan view of the first principal surface 100ST of a principal function section 10D of a touch panel according to a fifth embodiment of the present invention.
Figure 16:
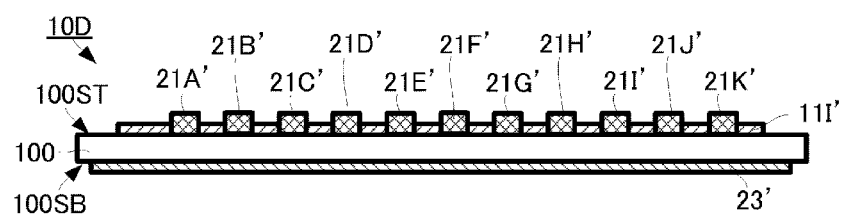
FIG. 16 is a side view of the principal function section 10D of the touch panel according to the fifth embodiment of the present invention.
Figure 17:
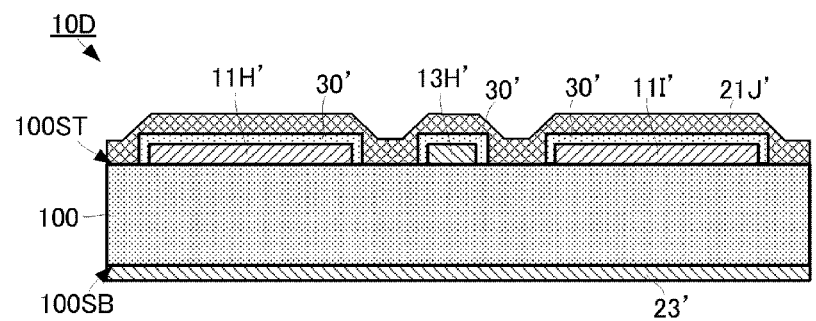
FIG. 17 is a side sectional view obtained by partially enlarging the principal function section 10D of the touch panel according to the fifth embodiment of the present invention.

Next, a touch panel according to a fifth embodiment will be described with reference to the drawings. FIG. 15 is a plan view of the first principal surface 100ST of a principal function section 10D of a touch panel according to a fifth embodiment of the present invention. FIG. 16 is a side view of the principal function section 10D of the touch panel according to the fifth embodiment of the present invention. FIG. 17 is a side sectional view obtained by partially enlarging the principal function section 10D of the touch panel according to the fifth embodiment of the present invention.

The touch panel shown in each of the foregoing embodiments has indicated the example of respectively arranging both the capacitance detection electrode and the piezoelectric voltage detection electrode on the first principal surface 100ST and the second principal surface 100SB as opposed to each other. In the touch panel of the present embodiment, the piezoelectric voltage detection electrode is arranged on each of the first principal surface 100ST and the second principal surface 100SB of the piezoelectric film 100, whereas the capacitance detection electrode is arranged only on the first principal surface 100ST side of the piezoelectric film 100.

On the first principal surface 100ST of the piezoelectric film 100, first capacitance detection sub-electrodes 11A' to 11I' are formed. The first capacitance detection sub-electrodes 11A' to 11I' are elongated electrodes extending in the first direction. The first capacitance detection sub-electrodes 11A' to 11I' are arranged at predetermined intervals along the second direction.

Further, on the first principal surface 100ST of the piezoelectric film 100, the first piezoelectric voltage detection sub-electrodes 13A' to 13H' are arrayed and formed. The first piezoelectric voltage detection sub-electrodes 13A' to 13H' are elongated electrodes extending in the first direction. Each of the first piezoelectric voltage detection sub-electrodes 13A' to 13H' is formed between the adjacent first capacitance detection sub-electrodes in the first capacitance detection sub-electrodes 11A' to 11I'. For example, the first piezoelectric voltage detection sub-electrode 13A' is formed between the first capacitance detection sub-electrode 11A' and the first capacitance detection sub-electrode 11B'. Similarly, each of the first piezoelectric voltage detection sub-electrodes 13B' to 13G' is also formed between the adjacent first capacitance detection sub-electrodes. The first piezoelectric voltage detection sub-electrode 13H' is formed between the first capacitance detection sub-electrodes 11H' and the first capacitance detection sub-electrode 11I'.

Protective layers 30' as insulators are formed on the surfaces of the first capacitance detection sub-electrodes 11A' to 11I' and the surface of the first piezoelectric voltage detection sub-electrodes 13A' to 13H'.

Second capacitance detection sub-electrodes 21A' to 21K' are formed on the first principal surface 100ST of the piezoelectric film 100, which is formed with the first capacitance detection sub-electrodes 11A' to 11I', the first piezoelectric voltage detection sub-electrodes 13A' to 13H' and the protective layers 30'. The second capacitance detection sub-electrodes 21A' to 21K' are elongated electrodes extending in the second direction. The second capacitance detection sub-electrodes 21A' to 21K' are arranged at predetermined intervals along the first direction.

A second piezoelectric voltage detection electrode 23' is formed on the second principal surface 100SB of the piezoelectric film 100. The second piezoelectric voltage detection electrode 23' is formed in a rectangular shape covering a predetermined area of the second principal surface 100SB. At this time, the second piezoelectric voltage detection electrode 23' is formed in size and shape to such a degree that a piezoelectric voltage can be detected even when any position in the region for detecting the pressed amount is pressed.

Even with such a structure formed, the touched position and the pressed amount (pressed force) can be detected simultaneously as in each of the foregoing embodiments. Further, a thin touch panel with high translucency can be realized.

Figure 18:
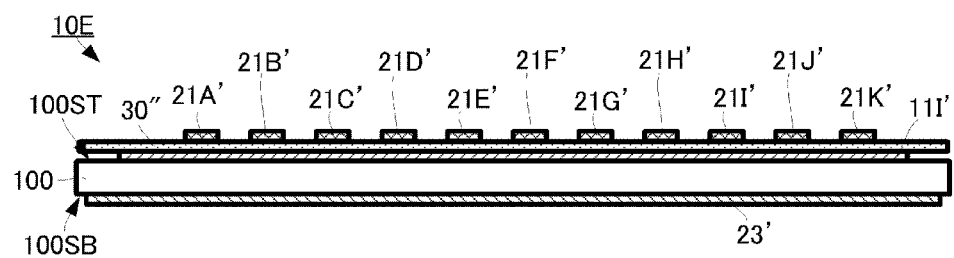
FIG. 18 is side view of a principal function section 10E of a touch panel according to a sixth embodiment of the present invention.
Figure 19:
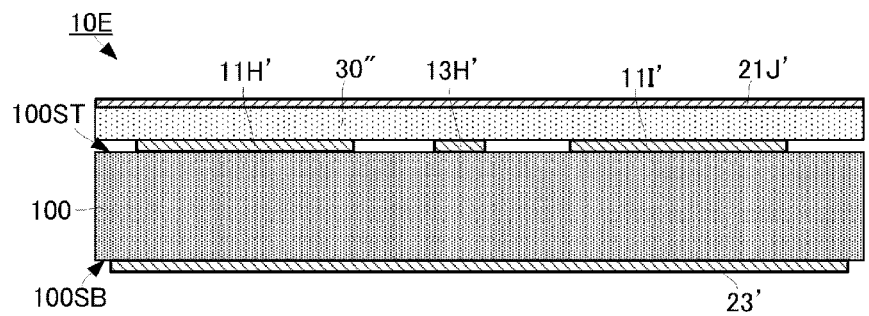
FIG. 19 is a side sectional view obtained by partially enlarging the principal function section 10E of the touch panel according to the sixth embodiment of the present invention.

Next, a touch panel according to a sixth embodiment will be described with reference to the drawings. FIG. 18 is a side view of a principal function section 10E of a touch panel according to a sixth embodiment of the present invention. FIG. 19 is a side sectional view obtained by partially enlarging the principal function section 10E of the touch panel according to the sixth embodiment of the present invention.

The touch panel of the present embodiment is different from the principal function section 10D of the touch panel shown in the fifth embodiment in terms of the electrode arrangement structure on the first principal surface 100ST side, and is the same as the touch panel according to the fifth embodiment in terms of the other configurations. Accordingly, only the different point will specifically be described.

On the first principal surface 100ST of the piezoelectric film 100, the first piezoelectric voltage detection sub-electrodes 13A' to 13H' and the first piezoelectric voltage detection sub-electrodes 13A' to 13H' are arrayed and formed as in the principal function section 10D of the touch panel of the fifth embodiment.

A protective layer 30" is formed substantially all over the surface of the first principal surface 100ST of the piezoelectric film 100 formed with the first capacitance detection sub-electrodes 11A' to 11I' and the surface of the first piezoelectric voltage detection sub-electrodes 13A' to 13H'.

On the surface (surface on the opposite side to the piezoelectric film 100) of the protective layer 30", the second capacitance detection sub-electrodes 21A' to 21K' are formed.

Even with such a structure formed, the touched position and the pressed amount (pressed force) can be detected simultaneously as in each of the foregoing embodiments. A thin touch panel with high translucency can be realized.

It should be noted that, although the examples of using the elongated capacitance detection sub-electrode have been shown in the foregoing fifth and sixth embodiments, it may be in the shape where the wide section and the narrow section are alternately connected, the shape having been shown in the foregoing first to fourth embodiments.

In addition, the example has been shown in the foregoing first to fourth embodiments where on each principal surface of flat membrane-like PLLA, the capacitance detection electrode is formed in the shape with the wide section and the narrow section being alternately connected while the piezoelectric voltage detection electrode is formed in the linear shape with a fixed width smaller than that of the capacitance detection electrode. However, the relation among the material for the piezoelectric film and each electrode pattern and electrode width is one example, and the foregoing function effect can be obtained so long as the configuration is one conceivable from combination of each of the foregoing embodiments and the configuration of each of the foregoing embodiments.

In addition, as for the piezoelectric film, although other piezoelectric elements may possibly be used, PLLA is highly preferably used when the piezoelectric constant, the permittivity, the pyroelectricity, the flexibility and the like are taken into consideration.

Figure 20:
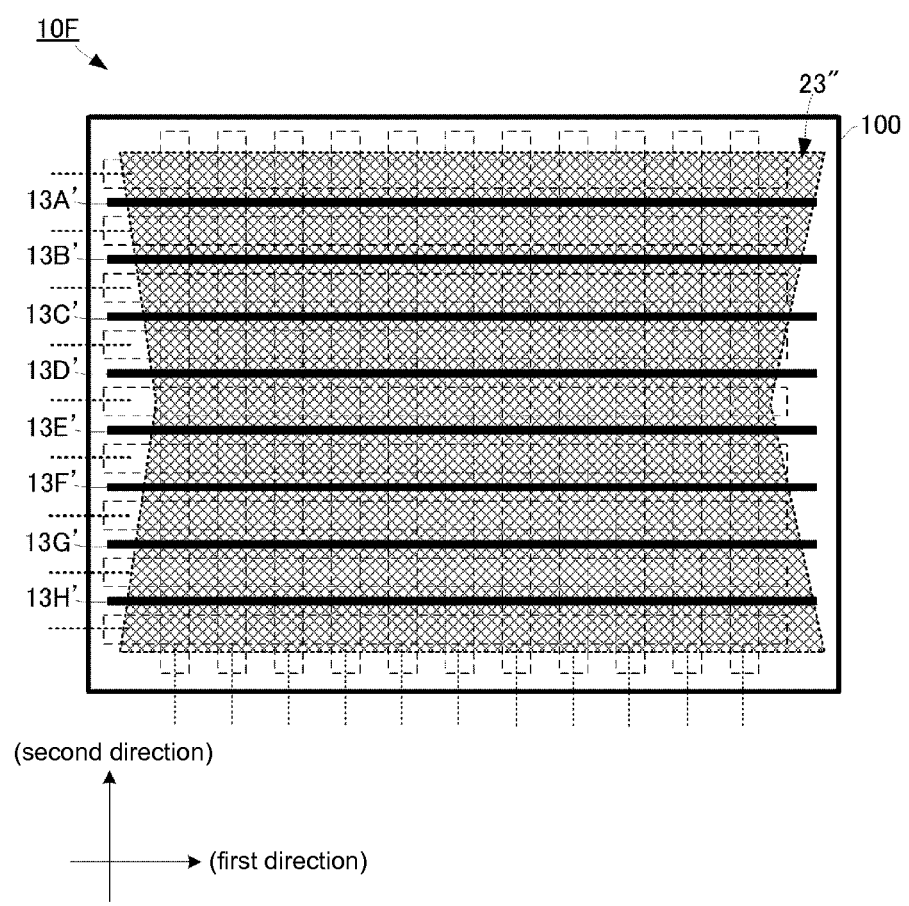
FIG. 20 is a diagram illustrating a shape example of a second piezoelectric voltage detection electrode.

Further, when the second piezoelectric voltage detection electrode is rectangular as shown in the foregoing fifth and sixth embodiments, it may be functioned to offset a detected voltage generated at each position of the second piezoelectric voltage detection electrode. In this case, the second piezoelectric voltage detection electrode may be formed not to be rectangular as illustrated in FIG. 20. FIG. 20 is a diagram illustrating a shape example of the second piezoelectric voltage detection electrode. As illustrated in FIG. 20, a second piezoelectric voltage detection electrode 23" is made up of the shape of being depressed to the center side of the first direction at each end of the first direction and in the vicinity of the center of the second direction. With such a shape formed, it is possible to suppress offsetting of the detected voltages.

It is thereby possible to detect a piezoelectric voltage with higher sensitivity. It is to be noted that the shape of the detection usage region is not restricted to this, but the shape of the second piezoelectric voltage detection electrode may be set as appropriate such that detected voltages are not offset. The shape of the second piezoelectric voltage detection electrode may be divided into a plurality of regions, e.g., four regions, and a voltage generated in each of the regions may be detected. In this case, the first piezoelectric voltage detection electrode can be used as a common electrode in each of the regions.

Further, although the electrode pattern which realizes the detection concept for the touched position by means of the projection-type mutual capacitance system has been used in the foregoing embodiment, the capacitance detection electrode may be formed in an electrode pattern which realizes the detection concept for the touched position by means of the projection-type self-capacitance system.

DESCRIPTION OF REFERENCE SYMBOLS 1, 1A, 1B, 1C: touch panel
10, 10, 10B, 10C, 10D, 10E: principal function section
30, 30', 30", 40: protective layer
50: elastic body
100: piezoelectric film
100ST: first principal surface 100SB: second principal surface
11A, 11B, 11C, 11D, 11E, 11F, 11A', 11B', 11C', 11D', 11E', 11F', 11G', 11H', 11I': first capacitance detection sub-electrode
21A, 21B, 21C, 21D, 21E, 21F, 21A', 21B', 21C', 21D', 21E', 21F', 21G', 21H', 21I', 21J', 21K': second capacitance detection sub-electrode
13A, 13B, 13C, 13D, 13E, 13F, 13G, 13H, 13I, 13J, 13K, 13L, 131A, 132A, 131B, 132B, 131C, 132C, 131D, 132D, 131E, 132E, 131H, 132H, 131I, 132I, 131J, 132J, 131K, 132K, 131L, 132L, 13A', 13B', 13C', 13D', 13E', 13F', 13G', 13H': first piezoelectric voltage detection sub-electrode
23', 23": second piezoelectric voltage detection electrode
23A, 23B, 23C, 23D, 23E, 23F, 23G, 23H, 23I, 23J, 23K, 23L, 231A, 232A, 231B, 232B, 231C, 232C, 231D, 232D, 231E, 232E, 231H, 232H, 231I, 232I, 231J, 232J, 231K, 232K, 231L, 232L: second piezoelectric voltage detection sub-electrode
12A to 12F, 14, 22A to 22F, 24, 141, 142, 143, 144, 241, 242, 243, 244: drawing electrode
111, 211: wide section
112, 212: narrow section
113, 213: end wide section
Ar1: first partial region
Ar2: second partial region
Ar3: third partial region
Ar4: fourth partial region

The invention claimed is:

1. A touch panel comprising:
   a piezoelectric film having a first principal surface and a second principal surface that are opposed to each other;
   a capacitance detection electrode arranged on one side of the first principal surface of the piezoelectric film and configured to detect a touched position; and
   a piezoelectric voltage detection electrode arranged on one side of each of the first principal surface and the second principal surface of the piezoelectric film and configured to detect a piezoelectric voltage in accordance with an amount pressed into the piezoelectric film, wherein
   the capacitance detection electrode includes:
      a plurality of first capacitance detection sub-electrodes which extend along a first direction parallel with the first principal surface, and are arranged at intervals in a second direction parallel with the first principal surface and intersect with the first direction; and
      a plurality of second capacitance detection sub-electrodes which extend along the second direction, and are arranged at intervals in the first direction, the piezoelectric voltage detection electrode includes:
      a first piezoelectric voltage detection sub-electrode on the one side of the first principal surface; and
      a second piezoelectric voltage detection sub-electrode on the one side of the second principal surface, and
   the first capacitance detection sub-electrode and the first piezoelectric voltage detection sub-electrode are on the same plane.

2. The touch panel according to claim 1, wherein the piezoelectric film is a flat membrane-like piezoelectric film.

3. The touch panel according to claim 1, wherein the piezoelectric film comprises polylactic acid having been stretch-treated at least in a uniaxial direction.

4. The touch panel according to claim 1, wherein the first piezoelectric voltage detection sub-electrode is located between individual first capacitance detection sub-electrodes of the plurality of first capacitance detection sub-electrodes.

5. The touch panel according to claim 1, further comprising:
a first protective layer on the plurality of first capacitance detection sub-electrodes and the first piezoelectric voltage detection sub-electrodes.

6. The touch panel according to claim 5, further comprising:
a second protective layer on the plurality of second capacitance detection sub-electrodes.

7. The touch panel according to claim 1, wherein the first capacitance detection sub-electrode and the second capacitance detection sub-electrode each include a first section and a second section that are alternately connected, the first section being wider than the second section.

8. The touch panel according to claim 7, wherein the second section of the first capacitance detection sub-electrode and the second section of the second capacitance detection sub-electrode are arranged so as to oppose each other.

9. The touch panel according to claim 8, wherein
the first section of the first capacitance detection sub-electrode and the first section of the second capacitance detection sub-electrode are arranged so as to not oppose each other, and
a gap having a predetermined width is located between both the first sections as viewed from a direction orthogonal to the first and second principal surfaces of the piezoelectric film, and
the opposed portion of the first piezoelectric voltage detection sub-electrode and the second piezoelectric voltage detection sub-electrode is located within the gap.

10. The touch panel according to claim 9, wherein
the first section of the first capacitance detection sub-electrode and the first section of the second capacitance detection sub-electrode are in a substantially square shape having an oblique line at substantially 45° with respect to each of the first direction and the second direction,
the first piezoelectric voltage detection sub-electrode has:
a linear section extending in the first direction along the second section of the first capacitance detection sub-electrode; and
an inclined section inclined at substantially 45° with respect to the first direction along the first section of the first capacitance detection sub-electrode, the second piezoelectric voltage detection sub-electrode has:
a linear section extending in the second direction along the second section of the second capacitance detection sub-electrode; and
an inclined section inclined at substantially 45° with respect to the second direction along the first section of the second capacitance detection sub-electrode, and
the inclined section of the first piezoelectric voltage detection sub-electrode and the inclined section of the second piezoelectric voltage detection sub-electrode are opposed to each other with the piezoelectric film therebetween.

11. The touch panel according to claim 1, wherein the piezoelectric voltage detection electrode is located in each partial region obtained by dividing a plane of the piezoelectric film into four regions.

12. A touch panel comprising:
a piezoelectric film having a first principal surface and a second principal surface that are opposed to each other;
a capacitance detection electrode arranged on one side of the first principal surface of the piezoelectric film and configured to detect a touched position; and
a piezoelectric voltage detection electrode arranged on one side of each of the first principal surface and the second principal surface of the piezoelectric film and configured to detect a piezoelectric voltage in accordance with an amount pressed into the piezoelectric film,
wherein the piezoelectric voltage detection electrode is located in each partial region obtained by dividing a plane of the piezoelectric film into four regions, and
wherein the piezoelectric voltage detection electrode is configured such that
an electrode in a first partial region and an electrode in a second partial region on the one side of the first principal surface are spaced from each other,
an electrode in a third partial region and an electrode in the fourth partial region on the one side of the first principal surface are continuous with each other,
an electrode in the first partial region and an electrode in the third partial region on the one side of the second principal surface are continuous with each other, and
an electrode in the second partial region and an electrode in the fourth partial region on the one side of the second principal surface are continuous with each other.

* * * * *